US008266198B2

(12) United States Patent
Lee et al.

(10) Patent No.: US 8,266,198 B2
(45) Date of Patent: *Sep. 11, 2012

(54) SPECIALIZED PROCESSING BLOCK FOR PROGRAMMABLE LOGIC DEVICE

(75) Inventors: Kwan Yee Martin Lee, Hayward, CA (US); Martin Langhammer, Salisbury (GB); Yi-Wen Lin, Pasadena, CA (US); Triet M. Nguyen, San Jose, CA (US)

(73) Assignee: Altera Corporation, San Jose, CA (US)

( * ) Notice: Subject to any disclaimer, the term of this patent is extended or adjusted under 35 U.S.C. 154(b) by 1011 days.

This patent is subject to a terminal disclaimer.

(21) Appl. No.: 11/447,329

(22) Filed: Jun. 5, 2006

(65) Prior Publication Data
US 2007/0185951 A1 Aug. 9, 2007

Related U.S. Application Data

(60) Provisional application No. 60/771,989, filed on Feb. 9, 2006.

(51) Int. Cl.
*G06F 7/38* (2006.01)
*H03K 19/173* (2006.01)
*H03K 19/177* (2006.01)

(52) U.S. Cl. .......... 708/523; 708/551; 708/552; 326/37; 326/39

(58) Field of Classification Search .......... 708/497–498, 708/551–553; 326/37–39
See application file for complete search history.

(56) References Cited

U.S. PATENT DOCUMENTS

| 3,473,160 A | 10/1969 | Wahlstrom |
| 3,800,130 A | 3/1974 | Martinson et al. |
| 4,156,927 A | 5/1979 | McElroy et al. |
| 4,179,746 A | 12/1979 | Tubbs |
| 4,212,076 A | 7/1980 | Conners |
| 4,215,406 A | 7/1980 | Gomola et al. |
| 4,215,407 A | 7/1980 | Gomola et al. |

(Continued)

FOREIGN PATENT DOCUMENTS
EP 0 158 430 10/1985
(Continued)

OTHER PUBLICATIONS

Xilinx Inc., "XTREME DSP for Virtex-4 FPGAs User Guide," v1.2, Feb. 4 2005.*

(Continued)

*Primary Examiner* — Chuong D Ngo
*Assistant Examiner* — Matthew Sandifer
(74) *Attorney, Agent, or Firm* — Ropes & Gray LLP; Jeffrey H. Ingerman

(57) ABSTRACT

A specialized processing block for a programmable logic device includes circuitry for performing multiplications and sums thereof, as well as circuitry for rounding the result. The rounding circuitry can selectably perform round-to-nearest and round-to-nearest-even operations. In addition, the bit position at which rounding occurs is preferably selectable. The specialized processing block preferably also includes saturation circuitry to prevent overflows and underflows, and the bit position at which saturation occurs also preferably is selectable. The selectability of both the rounding and saturation positions provides control of the output data word width. The rounding and saturation circuitry may be selectably located in different positions based on timing needs. Similarly, rounding may be speeded up using a look-ahead mode in which both rounded and unrounded results are computed in parallel, with the rounding logic selecting between those results.

34 Claims, 10 Drawing Sheets

U.S. PATENT DOCUMENTS

| | | | |
|---|---|---|---|
| 4,422,155 A | 12/1983 | Amir et al. | |
| 4,484,259 A | 11/1984 | Palmer et al. | |
| 4,521,907 A | 6/1985 | Amir et al. | |
| 4,575,812 A | 3/1986 | Kloker et al. | |
| 4,597,053 A | 6/1986 | Chamberlin | |
| 4,616,330 A | 10/1986 | Betz | |
| 4,623,961 A | 11/1986 | Mackiewicz | |
| 4,682,302 A | 7/1987 | Williams | |
| 4,718,057 A | 1/1988 | Venkitakrishnan et al. | |
| 4,727,508 A | 2/1988 | Williams | |
| 4,736,335 A | 4/1988 | Barkan | |
| 4,791,590 A | 12/1988 | Ku et al. | |
| 4,799,004 A | 1/1989 | Mori | |
| 4,823,295 A | 4/1989 | Mader | |
| 4,839,847 A | 6/1989 | Laprade | |
| 4,871,930 A | 10/1989 | Wong et al. | |
| 4,912,345 A | 3/1990 | Steele et al. | |
| 4,918,637 A | 4/1990 | Morton | |
| 4,967,160 A | 10/1990 | Quievy et al. | |
| 4,982,354 A | 1/1991 | Takeuchi et al. | |
| 4,991,010 A | 2/1991 | Hailey et al. | |
| 4,994,997 A | 2/1991 | Martin et al. | |
| 5,073,863 A | 12/1991 | Zhang | |
| 5,081,604 A | 1/1992 | Tanaka | |
| 5,122,685 A | 6/1992 | Chan et al. | |
| 5,128,559 A | 7/1992 | Steele | |
| 5,175,702 A | 12/1992 | Beraud et al. | |
| 5,208,491 A | 5/1993 | Ebeling et al. | |
| RE34,363 E | 8/1993 | Freeman | |
| 5,267,187 A | 11/1993 | Hsieh et al. | |
| 5,296,759 A | 3/1994 | Sutherland et al. | |
| 5,338,983 A | 8/1994 | Agarwala | |
| 5,339,263 A | 8/1994 | White | |
| 5,349,250 A | 9/1994 | New | |
| 5,357,152 A | 10/1994 | Jennings, III et al. | |
| 5,371,422 A | 12/1994 | Patel et al. | |
| 5,375,079 A | 12/1994 | Uramoto et al. | |
| 5,381,357 A | 1/1995 | Wedgwood et al. | |
| 5,404,324 A | 4/1995 | Colon-Bonet | |
| 5,424,589 A | 6/1995 | Dobbelaere et al. | |
| 5,446,651 A | 8/1995 | Moyse et al. | |
| 5,451,948 A | 9/1995 | Jekel | |
| 5,452,231 A | 9/1995 | Butts et al. | |
| 5,452,375 A | 9/1995 | Rousseau et al. | |
| 5,457,644 A | 10/1995 | McCollum | |
| 5,465,226 A | 11/1995 | Goto | |
| 5,465,375 A | 11/1995 | Thepaut et al. | |
| 5,483,178 A | 1/1996 | Costello et al. | |
| 5,497,498 A | 3/1996 | Taylor | |
| 5,500,812 A | 3/1996 | Saishi et al. | |
| 5,500,828 A | 3/1996 | Doddington et al. | |
| 5,523,963 A | 6/1996 | Hsieh et al. | |
| 5,528,550 A | 6/1996 | Pawate et al. | |
| 5,537,601 A | 7/1996 | Kimura et al. | |
| 5,541,864 A | 7/1996 | Van Bavel et al. | |
| 5,546,018 A | 8/1996 | New et al. | |
| 5,550,993 A | 8/1996 | Ehlig et al. | |
| 5,559,450 A | 9/1996 | Ngai et al. | |
| 5,563,526 A | 10/1996 | Hastings et al. | |
| 5,563,819 A | 10/1996 | Nelson | |
| 5,570,039 A | 10/1996 | Oswald et al. | |
| 5,570,040 A | 10/1996 | Lytle et al. | |
| 5,572,148 A | 11/1996 | Lytle et al. | |
| 5,581,501 A | 12/1996 | Sansbury et al. | |
| 5,590,350 A | 12/1996 | Guttag et al. | |
| 5,594,366 A | 1/1997 | Khong et al. | |
| 5,594,912 A | 1/1997 | Brueckmann et al. | |
| 5,596,763 A | 1/1997 | Guttag et al. | |
| 5,606,266 A | 2/1997 | Pedersen | |
| 5,617,058 A | 4/1997 | Adrian et al. | |
| 5,631,848 A | 5/1997 | Laczko et al. | |
| 5,633,601 A | 5/1997 | Nagaraj | |
| 5,636,150 A | 6/1997 | Okamoto | |
| 5,636,368 A | 6/1997 | Harrison et al. | |
| 5,640,578 A | 6/1997 | Balmer et al. | |
| 5,644,519 A * | 7/1997 | Yatim et al. | 708/523 |
| 5,644,522 A | 7/1997 | Moyse et al. | |
| 5,646,545 A | 7/1997 | Trimberger et al. | |
| 5,646,875 A | 7/1997 | Taborn et al. | |
| 5,648,732 A | 7/1997 | Duncan | |
| 5,652,903 A | 7/1997 | Weng et al. | |
| 5,655,069 A | 8/1997 | Ogawara et al. | |
| 5,664,192 A | 9/1997 | Lloyd et al. | |
| 5,689,195 A | 11/1997 | Cliff et al. | |
| 5,696,708 A | 12/1997 | Leung | |
| 5,729,495 A | 3/1998 | Madurawe | |
| 5,740,404 A | 4/1998 | Baji | |
| 5,744,980 A | 4/1998 | McGowan et al. | |
| 5,744,991 A | 4/1998 | Jefferson et al. | |
| 5,754,459 A | 5/1998 | Telikepalli | |
| 5,761,483 A | 6/1998 | Trimberger | |
| 5,764,555 A | 6/1998 | McPherson et al. | |
| 5,768,613 A | 6/1998 | Asghar | |
| 5,771,186 A | 6/1998 | Kodali et al. | |
| 5,777,912 A | 7/1998 | Leung et al. | |
| 5,784,636 A | 7/1998 | Rupp | |
| 5,790,446 A | 8/1998 | Yu et al. | |
| 5,794,067 A | 8/1998 | Kadowaki | |
| 5,801,546 A | 9/1998 | Pierce et al. | |
| 5,805,477 A | 9/1998 | Perner | |
| 5,805,913 A | 9/1998 | Guttag et al. | |
| 5,808,926 A * | 9/1998 | Gorshtein et al. | 708/505 |
| 5,812,479 A | 9/1998 | Cliff et al. | |
| 5,812,562 A | 9/1998 | Baeg | |
| 5,815,422 A | 9/1998 | Dockser | |
| 5,821,776 A | 10/1998 | McGowan | |
| 5,825,202 A | 10/1998 | Tavana et al. | |
| 5,838,165 A | 11/1998 | Chatter | |
| 5,841,684 A | 11/1998 | Dockser | |
| 5,847,579 A | 12/1998 | Trimberger | |
| 5,847,978 A | 12/1998 | Ogura et al. | |
| 5,847,981 A | 12/1998 | Kelley et al. | |
| 5,859,878 A | 1/1999 | Phillips et al. | |
| 5,869,979 A | 2/1999 | Bocchino | |
| 5,872,380 A | 2/1999 | Rostoker et al. | |
| 5,874,834 A | 2/1999 | New | |
| 5,878,250 A | 3/1999 | LeBlanc | |
| 5,880,981 A | 3/1999 | Kojima et al. | |
| 5,892,962 A | 4/1999 | Cloutier | |
| 5,894,228 A | 4/1999 | Reddy et al. | |
| 5,898,602 A | 4/1999 | Rothman et al. | |
| 5,931,898 A | 8/1999 | Khoury | |
| 5,942,914 A | 8/1999 | Reddy et al. | |
| 5,944,774 A | 8/1999 | Dent | |
| 5,949,710 A | 9/1999 | Pass et al. | |
| 5,951,673 A | 9/1999 | Miyata | |
| 5,956,265 A | 9/1999 | Lewis | |
| 5,959,871 A | 9/1999 | Pierzchala et al. | |
| 5,960,193 A | 9/1999 | Guttag et al. | |
| 5,961,635 A | 10/1999 | Guttag et al. | |
| 5,963,048 A | 10/1999 | Harrison et al. | |
| 5,963,050 A | 10/1999 | Young et al. | |
| 5,968,196 A | 10/1999 | Ramamurthy et al. | |
| 5,970,254 A | 10/1999 | Cooke et al. | |
| 5,978,260 A | 11/1999 | Trimberger et al. | |
| 5,982,195 A | 11/1999 | Cliff et al. | |
| 5,986,465 A | 11/1999 | Mendel | |
| 5,991,788 A | 11/1999 | Mintzer | |
| 5,991,898 A | 11/1999 | Rajski et al. | |
| 5,995,748 A | 11/1999 | Guttag et al. | |
| 5,999,015 A | 12/1999 | Cliff et al. | |
| 5,999,990 A | 12/1999 | Sharrit et al. | |
| 6,005,806 A | 12/1999 | Madurawe et al. | |
| 6,006,321 A | 12/1999 | Abbott | |
| 6,009,451 A | 12/1999 | Burns | |
| 6,018,755 A | 1/2000 | Gonikberg et al. | |
| 6,020,759 A | 2/2000 | Heile | |
| 6,021,423 A | 2/2000 | Nag et al. | |
| 6,029,187 A | 2/2000 | Verbauwhede | |
| 6,031,763 A | 2/2000 | Sansbury | |
| 6,041,339 A | 3/2000 | Yu et al. | |
| 6,041,340 A | 3/2000 | Mintzer | |
| 6,052,327 A | 4/2000 | Reddy et al. | |
| 6,052,755 A | 4/2000 | Terrill et al. | |
| 6,055,555 A | 4/2000 | Boswell et al. | |
| 6,064,614 A | 5/2000 | Khoury | |
| 6,065,131 A | 5/2000 | Andrews et al. | |

| Patent | Kind | Date | Inventor |
|---|---|---|---|
| 6,066,960 | A | 5/2000 | Pedersen |
| 6,069,487 | A | 5/2000 | Lane et al. |
| 6,072,994 | A | 6/2000 | Phillips et al. |
| 6,073,154 | A | 6/2000 | Dick |
| 6,075,381 | A | 6/2000 | LaBerge |
| 6,084,429 | A | 7/2000 | Trimberger |
| 6,085,317 | A | 7/2000 | Smith |
| 6,091,261 | A | 7/2000 | DeLange |
| 6,091,765 | A | 7/2000 | Pietzold, III et al. |
| 6,094,726 | A | 7/2000 | Gonion et al. |
| 6,097,988 | A | 8/2000 | Tobias |
| 6,098,163 | A | 8/2000 | Guttag et al. |
| 6,107,820 | A | 8/2000 | Jefferson et al. |
| 6,107,821 | A | 8/2000 | Kelem et al. |
| 6,107,824 | A | 8/2000 | Reddy et al. |
| 6,130,554 | A | 10/2000 | Kolze et al. |
| 6,140,839 | A | 10/2000 | Kaviani et al. |
| 6,144,980 | A | 11/2000 | Oberman |
| 6,154,049 | A | 11/2000 | New |
| 6,157,210 | A | 12/2000 | Zaveri et al. |
| 6,163,788 | A | 12/2000 | Chen et al. |
| 6,167,415 | A | 12/2000 | Fischer et al. |
| 6,175,849 | B1 | 1/2001 | Smith |
| 6,215,326 | B1 | 4/2001 | Jefferson et al. |
| 6,226,735 | B1 | 5/2001 | Mirsky |
| 6,242,947 | B1 | 6/2001 | Trimberger |
| 6,243,729 | B1 | 6/2001 | Staszewski |
| 6,246,258 | B1 | 6/2001 | Lesea |
| 6,260,053 | B1 | 7/2001 | Maulik et al. |
| 6,279,021 | B1 | 8/2001 | Takano et al. |
| 6,286,024 | B1 | 9/2001 | Yano et al. |
| 6,314,442 | B1 | 11/2001 | Suzuki |
| 6,314,551 | B1 | 11/2001 | Borland |
| 6,321,246 | B1 | 11/2001 | Page et al. |
| 6,323,680 | B1 | 11/2001 | Pedersen et al. |
| 6,327,605 | B2 | 12/2001 | Arakawa et al. |
| 6,351,142 | B1 | 2/2002 | Abbott |
| 6,353,843 | B1 | 3/2002 | Chehrazi et al. |
| 6,360,240 | B1 | 3/2002 | Takano et al. |
| 6,362,650 | B1 | 3/2002 | New et al. |
| 6,363,650 | B1 | 4/2002 | Beeler |
| 6,366,944 | B1 | 4/2002 | Hossain et al. |
| 6,367,003 | B1 | 4/2002 | Davis |
| 6,369,610 | B1 | 4/2002 | Cheung et al. |
| 6,377,970 | B1 | 4/2002 | Abdallah et al. |
| 6,407,576 | B1 | 6/2002 | Ngai et al. |
| 6,407,694 | B1 | 6/2002 | Cox et al. |
| 6,427,157 | B1 | 7/2002 | Webb |
| 6,434,587 | B1 | 8/2002 | Liao et al. |
| 6,438,569 | B1 | 8/2002 | Abbott |
| 6,438,570 | B1 | 8/2002 | Miller |
| 6,446,107 | B1 | 9/2002 | Knowles |
| 6,453,382 | B1 | 9/2002 | Heile |
| 6,467,017 | B1 | 10/2002 | Ngai et al. |
| 6,480,980 | B2 | 11/2002 | Koe |
| 6,483,343 | B1 | 11/2002 | Faith et al. |
| 6,487,575 | B1 | 11/2002 | Oberman |
| 6,523,055 | B1 | 2/2003 | Yu et al. |
| 6,523,057 | B1 | 2/2003 | Savo et al. |
| 6,531,888 | B2 | 3/2003 | Abbott |
| 6,538,470 | B1 * | 3/2003 | Langhammer et al. ......... 326/41 |
| 6,542,000 | B1 | 4/2003 | Black et al. |
| 6,556,044 | B2 | 4/2003 | Langhammer et al. |
| 6,557,092 | B1 | 4/2003 | Callen |
| 6,571,268 | B1 * | 5/2003 | Giacalone et al. ............ 708/524 |
| 6,573,749 | B2 | 6/2003 | New et al. |
| 6,574,762 | B1 | 6/2003 | Karimi et al. |
| 6,591,283 | B1 | 7/2003 | Conway et al. |
| 6,591,357 | B2 | 7/2003 | Mirsky |
| 6,600,495 | B1 | 7/2003 | Boland et al. |
| 6,600,788 | B1 | 7/2003 | Dick et al. |
| 6,628,140 | B2 | 9/2003 | Langhammer et al. |
| 6,687,722 | B1 | 2/2004 | Larsson et al. |
| 6,692,534 | B1 | 2/2004 | Wang et al. |
| 6,700,581 | B2 | 3/2004 | Baldwin et al. |
| 6,725,441 | B1 | 4/2004 | Keller et al. |
| 6,728,901 | B1 | 4/2004 | Rajski et al. |
| 6,731,133 | B1 | 5/2004 | Feng et al. |
| 6,732,134 | B1 | 5/2004 | Rosenberg et al. |
| 6,744,278 | B1 | 6/2004 | Liu et al. |
| 6,745,254 | B2 | 6/2004 | Boggs et al. |
| 6,763,367 | B2 | 7/2004 | Kwon et al. |
| 6,771,094 | B1 | 8/2004 | Langhammer et al. |
| 6,774,669 | B1 | 8/2004 | Liu et al. |
| 6,781,408 | B1 | 8/2004 | Langhammer |
| 6,781,410 | B1 | 8/2004 | Pani et al. |
| 6,788,104 | B2 | 9/2004 | Singh et al. |
| 6,801,924 | B1 | 10/2004 | Green et al. |
| 6,836,839 | B2 | 12/2004 | Master et al. |
| 6,874,079 | B2 | 3/2005 | Hogenauer |
| 6,889,238 | B2 | 5/2005 | Johnson |
| 6,904,471 | B2 | 6/2005 | Boggs et al. |
| 6,924,663 | B2 | 8/2005 | Masui et al. |
| 6,963,890 | B2 | 11/2005 | Dutta et al. |
| 6,971,083 | B1 | 11/2005 | Farrugia et al. |
| 6,978,287 | B1 * | 12/2005 | Langhammer ................ 708/230 |
| 6,983,300 | B2 | 1/2006 | Ferroussat |
| 7,020,673 | B2 * | 3/2006 | Ozawa .......................... 708/490 |
| 7,047,272 | B2 | 5/2006 | Giacalone et al. |
| 7,062,526 | B1 | 6/2006 | Hoyle |
| 7,093,204 | B2 | 8/2006 | Oktem et al. |
| 7,107,305 | B2 | 9/2006 | Deng et al. |
| 7,113,969 | B1 | 9/2006 | Green et al. |
| 7,181,484 | B2 | 2/2007 | Stribaek et al. |
| 7,313,585 | B2 | 12/2007 | Winterrowd |
| 7,392,923 | B2 | 7/2008 | Stroh et al. |
| 7,395,298 | B2 | 7/2008 | Debes et al. |
| 7,401,109 | B2 | 7/2008 | Koc et al. |
| 7,409,417 | B2 | 8/2008 | Lou |
| 7,415,542 | B2 | 8/2008 | Hennedy et al. |
| 7,421,465 | B1 | 9/2008 | Rarick et al. |
| 7,428,565 | B2 | 9/2008 | Fujimori |
| 7,428,566 | B2 | 9/2008 | Siu et al. |
| 7,430,578 | B2 | 9/2008 | Debes et al. |
| 7,430,656 | B2 | 9/2008 | Sperber et al. |
| 7,447,310 | B2 | 11/2008 | Koc et al. |
| 7,467,176 | B2 * | 12/2008 | Zheng et al. .................. 708/551 |
| 7,472,155 | B2 * | 12/2008 | Simkins et al. ............... 708/523 |
| 7,508,936 | B2 | 3/2009 | Eberle et al. |
| 7,536,430 | B2 | 5/2009 | Guevokian et al. |
| 7,567,997 | B2 | 7/2009 | Simkins et al. |
| 7,590,676 | B1 | 9/2009 | Langhammer |
| 7,646,430 | B2 | 1/2010 | Brown Elliott et al. |
| 7,668,896 | B2 | 2/2010 | Lutz et al. |
| 7,719,446 | B2 | 5/2010 | Rosenthal et al. |
| 7,769,797 | B2 | 8/2010 | Cho et al. |
| 7,822,799 | B1 | 10/2010 | Langhammer et al. |
| 7,930,335 | B2 | 4/2011 | Gura |
| 7,930,336 | B2 | 4/2011 | Langhammer |
| 2001/0023425 | A1 | 9/2001 | Oberman et al. |
| 2001/0029515 | A1 | 10/2001 | Mirsky |
| 2001/0037352 | A1 | 11/2001 | Hong |
| 2002/0002573 | A1 | 1/2002 | Landers et al. |
| 2002/0038324 | A1 | 3/2002 | Page et al. |
| 2002/0049798 | A1 | 4/2002 | Wang et al. |
| 2002/0078114 | A1 | 6/2002 | Wang et al. |
| 2002/0089348 | A1 | 7/2002 | Langhammer |
| 2002/0116434 | A1 | 8/2002 | Nancekievill |
| 2003/0088757 | A1 | 5/2003 | Lindner et al. |
| 2004/0064770 | A1 | 4/2004 | Xin |
| 2004/0083412 | A1 | 4/2004 | Corbin et al. |
| 2004/0103133 | A1 | 5/2004 | Gurney |
| 2004/0122882 | A1 | 6/2004 | Zakharov et al. |
| 2004/0148321 | A1 | 7/2004 | Guevorkian et al. |
| 2004/0172439 | A1 | 9/2004 | Lin |
| 2004/0178818 | A1 | 9/2004 | Crotty et al. |
| 2004/0193981 | A1 | 9/2004 | Clark et al. |
| 2004/0267857 | A1 | 12/2004 | Abel et al. |
| 2004/0267863 | A1 | 12/2004 | Bhushan et al. |
| 2005/0038842 | A1 | 2/2005 | Stoye |
| 2005/0144212 | A1 | 6/2005 | Simkins et al. |
| 2005/0144215 | A1 | 6/2005 | Simkins et al. |
| 2005/0144216 | A1 | 6/2005 | Simkins et al. |
| 2005/0166038 | A1 | 7/2005 | Wang et al. |
| 2005/0187997 | A1 | 8/2005 | Zheng et al. |
| 2005/0187999 | A1 | 8/2005 | Zheng et al. |
| 2005/0262175 | A1 | 11/2005 | Iino et al. |
| 2006/0020655 | A1 | 1/2006 | Lin |

| | | | |
|---|---|---|---|
| 2007/0083585 | A1 | 4/2007 | St. Denis et al. |
| 2007/0185951 | A1 | 8/2007 | Lee et al. |
| 2007/0185952 | A1 | 8/2007 | Langhammer et al. |
| 2007/0241773 | A1 | 10/2007 | Hutchings et al. |
| 2008/0133627 | A1 | 6/2008 | Langhammer et al. |
| 2008/0183783 | A1 | 7/2008 | Tubbs |
| 2009/0172052 | A1 | 7/2009 | DeLaquil et al. |
| 2009/0187615 | A1 | 7/2009 | Abe et al. |
| 2009/0300088 | A1 | 12/2009 | Michaels et al. |
| 2010/0098189 | A1 | 4/2010 | Oketani |

FOREIGN PATENT DOCUMENTS

| | | |
|---|---|---|
| EP | 0 380 456 | 8/1990 |
| EP | 0 411 491 | 2/1991 |
| EP | 0 461 798 | 12/1991 |
| EP | 0 498 066 | 8/1992 |
| EP | 0 555 092 | 8/1993 |
| EP | 0 606 653 | 7/1994 |
| EP | 0 657 803 | 6/1995 |
| EP | 0 660 227 | 6/1995 |
| EP | 0 668 659 | 8/1995 |
| EP | 0 721 159 | 7/1996 |
| EP | 0 905 906 | 3/1999 |
| EP | 0 909 028 | 4/1999 |
| EP | 0 927 393 | 7/1999 |
| EP | 0 992 885 | 4/2000 |
| EP | 1 031 934 | 8/2000 |
| EP | 1 058 185 | 12/2000 |
| EP | 1058185 A1 * | 12/2000 |
| EP | 1 220 108 | 7/2002 |
| GB | 2 283 602 | 5/1995 |
| GB | 2 286 737 | 8/1995 |
| GB | 2 318 198 | 4/1998 |
| JP | 61-237133 | 10/1986 |
| JP | 63-216131 | 8/1988 |
| JP | 4-332036 | 11/1992 |
| JP | 5-134851 | 6/1993 |
| JP | 06-187129 | 7/1994 |
| JP | 7-135447 | 5/1995 |
| JP | 11-296345 | 10/1999 |
| JP | 2000-259394 | 9/2000 |
| JP | 2002-108606 | 4/2002 |
| JP | 2002-251281 | 9/2002 |
| WO | WO95/27243 | 10/1995 |
| WO | WO96/28774 | 9/1996 |
| WO | WO97/08606 | 3/1997 |
| WO | WO98/12629 | 3/1998 |
| WO | WO98/32071 | 7/1998 |
| WO | WO98/38741 | 9/1998 |
| WO | WO99/22292 | 5/1999 |
| WO | WO99/31574 | 6/1999 |
| WO | WO99/56394 | 11/1999 |
| WO | WO00/51239 | 8/2000 |
| WO | WO00/52824 | 9/2000 |
| WO | WO01/13562 | 2/2001 |
| WO | WO 2005/066832 | 7/2005 |
| WO | WO-2005/101190 | 10/2005 |

OTHER PUBLICATIONS

Altera Corporation, "Stratix II Device Handbook, Chapter 6-DSP Blocks in Stratix II Devices," as revised in Jun. 2004, v1.1.*

Underwood, K. "FPGAs vs. CPUs: trends in peak floating-point performance," Proceedings of the 2004 ACM/SIGDA 12th international Symposium on Field Programmable Gate Arrays, pp. 171-180, 2004.*

Altera Corporation, "Stratix II Device Handbook, Chapter 6-DSP Blocks in Stratix II Devices," v1.1, Jul. 2004.*

Xilinx Inc., "Complex Multiplier v2.0", DS291 Product Specification/Datasheet, Nov. 2004.*

Amos, D., "PLD architectures match DSP algorithms," *Electronic Product Design*, vol. 17, No. 7, Jul. 1996. pp. 30, 32.

Analog Devices, Inc., The Applications Engineering Staff of Analog Devices, DSP Division, *Digital Signal Processing Applications Using the ADSP-2100 Family* (edited by Amy Mar), 1990, pp. 141-92).

Andrejas, J., et al., "Reusable DSP functions in FPGAs," *Field-Programmable Logic and Applications. Roadmap to Reconfigurable Computing. 10th International Conference, FPL 2000. Proceedings {Lecture Notes in Computer Science* vol. 1896}, Aug. 27-30, 2000, pp. 456-461.

Aoki, T., "Signed-weight arithmetic and its application to a field-programmable digital filter architecture," *IEICE Transactions on Electronics* , 1999 , vol. E82C, No. 9, Sep. 1999, pp. 1687-1698.

Ashour, M.A., et al., "An FPGA implementation guide for some different types of serial-parallel multiplier-structures," *Microelectronics Journal* , vol. 31, No. 3, 2000, pp. 161-168.

Berg. B.L., et al."Designing Power and Area Efficient Multistage FIR Decimators with Economical Low Order Filters," *ChipCenter Technical Note*, Dec. 2001.

Bursky, D., "Programmable Logic Challenges Traditional ASIC SoC Designs", *Electronic Design*, Apr. 15, 2002.

Chhabra, A. et al., Texas Instruments Inc., "A Block Floating Point Implementation on the TMS320C54x DSP", Application Report SPRA610, Dec. 1999, pp. 1-10.

Colet, p., "When DSPs and FPGAs meet: Optimizing image processing architectures," *Advanced Imaging* vol. 12, No. 9, Sep. 1997, pp. 14, 16, 18.

Crookes, D., et al., "Design and implementation of a high level programming environment for FPGA-based image processing," *IEE Proceedings-Vision, Image and Signal Processing*, vol. 147, No. 4, Aug. 2000, pp. 377-384.

Debowski, L., et al., "A new flexible architecture of digital control systems based on DSP and complex CPLD technology for power conversion applications," *PCIM 2000: Europe Official Proceedings of the Thirty-Seventh International Intelligent Motion Conference*, Jun. 6-8, 2000, pp. 281-286.

Dick, C., et al., "Configurable logic for digital communications: some signal processing perspectives," *IEEE Communications Magazine*, vol. 37, No. 8, Aug. 1999, pp. 107-111.

Do, T.-T., et al., "A flexible implementation of high-performance FIR filters on Xilinx FPGAs," *Field-Programmable Logic and Applications: From FPGAs to Computing Paradigm. 8th International Workshop, FPL'98. Proceedings*, Hartenstein, R.W., et al., eds., Aug. 31-Sep. 3, 1998, pp. 441-445.

Gaffar, A.A., et al., "Floating-Point Bitwidth Analysis via Automatic Differentiation," *IEEE Conference on Field Programmable Technology*, Hong Kong, Dec. 2002.

Guccione, S.A.,"Run-time Reconfiguration at Xilinx," *Parallel and distributed processing: 15 IPDPS 2000 workshops*, Rolim, J., ed., May 1-5, 2000, p. 873.

Hauck, S., "The Future of Reconfigurable Systems," *Keynote Address, 5th Canadian Conference on Field Programmable Devices*, Jun. 1998, http://www.ee.washington.edu/people/faculty/hauck/publications/ReconfigFuture.PDF.

Heysters, P.M., et al., "Mapping of DSP algorithms on field programmable function arrays," *Field-Programmable Logic and Applications. Roadmap to Reconfigurable Computing. 10th International Conference, FPL 2000 Proceedings* (*Lecture Notes in Computer Science vol. 1896*), Aug. 27-30, 2000, pp. 400-411.

Huang, J., et al., "Simulated Performance of 1000BASE-T Receiver with Different Analog Front End Designs," *Proceedings of the 35th Asilomar Conference on Signals, Systems, and Computers*, Nov. 4-7, 2001.

Lattice Semiconductor Corp, *ORCA ® FPGA Express ™ Interface Manual: ispLEVER® Version 3.0*, 2002.

Lucent Technologies, Microelectronics Group,"Implementing and Optimizing Multipliers in ORCA™ FPGAs,", Application Note. AP97-008FGPA, Feb. 1997.

"Implementing Multipliers in FLEX 10K EABs", *Altera*, Mar. 1996.

"Implementing Logic with the Embedded Array in FLEX 10K Devices", *Altera*, May 2001, ver. 2.1.

Jinghua Li, "Design a pocket multi-bit multiplier in FPGA," *1996 2nd International Conference on ASIC Proceedings (IEEE Cat. No. 96TH8140)*, Oct. 21-24, 1996, pp. 275-279.

Jones, G., "Field-programmable digital signal conditioning," *Electronic Product Design*, vol. 21, No. 6, Jun. 2000, pp. C36-38.

Kiefer, R., et al., "Performance comparison of software/FPGA hardware partitions for a DSP application," *14th Australian Microelectronics Conference. Microelectronics: Technology Today for the Future. MICRO '97 Proceedings*, Sep. 28-Oct. 1, 1997, pp. 88-93.

Kramberger, I., "DSP acceleration using a reconfigurable FPGA," ISIE '99. *Proceedings of the IEEE International Symposium on Industrial Electronics (Cat. No. 99TH8465)*, vol. 3 , Jul. 12-16, 1999, pp. 1522-1525.

Langhammer, M., "How to implement DSP in programmable logic," *Elettronica Oggi*, No. 266 , Dec. 1998, pp. 113-115.

Langhammer, M., "Implementing a DSP in Programmable Logic," *Online EE Times*, May 1998, http://www.eetimes.com/editorial/1998/coverstory9805.html.

Lazaravich, B.V., "Function block oriented field programmable logic arrays," *Motorola, Inc. Technical Developments*, vol. 18, Mar. 1993, pp. 10-11.

Lund, D., et al., "A new development system for reconfigurable digital signal processing," First International Conference on 3G Mobile Communication Technologies (Conf. Publ. No. 471), Mar. 27-29, 2000, pp. 306-310.

Miller, N.L., et al., "Reconfigurable integrated circuit for high performance computer arithmetic," *Proceedings of the 1998 IEE Colloquium on Evolvable Hardware Systems (Digest)*, No. 233, 1998, pp. 2/1-2/4.

Mintzer, L, "Xilinx FPGA as an FFT processor," *Electronic Engineering*, vol. 69, No. 845, May 1997, pp. 81, 82, 84.

Faura et al., "A Novel Mixed Signal Programmable Device With On-Chip Microprocessor," Custom Integrated Circuits Conference, 1997. Proceedings of the IEEE 1997 Santa Clara, CA, USA, May 5, 1997, pp. 103-106.

Nozal, L., et al., "A new vision system: programmable logic devices and digital signal processor architecture (PLD+DSP)," *Proceedings IECON '91. 1991 International Conference on Industrial Electronics, Control and Instrumentation (Cat. No. 91CH2976-9)*, vol. 3, Oct. 28-Nov. 1, 1991, pp. 2014-2018.

Papenfuss, J.R, et al., "Implementation of a real-time, frequency selective, RF channel simulator using a hybrid DSP-FPGA architecture," RAWCON 2000: 2000 IEEE Radio and Wireless Conference (Cat. No. 00EX404), Sep. 10-13, 2000, pp. 135-138.

Parhami, B., "Configurable arithmetic arrays with data-driven control," *34th Asilomar Conference on Signals, Systems and Computers*, vol. 1, 2000, pp. 89-93.

"The QuickDSP Design Guide", Quicklogic, Aug. 2001, revision B.

"QuickDSP™ Family Data Sheet", *Quicklogic*, Aug. 7, 2001, revision B.

Rangasayee, K., "Complex PLDs let you produce efficient arithmetic designs," *EDN (European Edition)*, vol. 41, No. 13, Jun. 20, 1996, pp. 109, 110, 112, 114, 116.

Rosado, A, et al., "A high-speed multiplier coprocessor unit based on FPGA," *Journal of Electrical Engineering*, vol. 48, No. 11-12, 1997, pp. 298-302.

Santillan-Q., G.F., et al., "Real-time integer convolution implemented using systolic arrays and a digit-serial architecture in complex programmable logic devices," *Proceedings of the Third International Workshop on Design of Mixed-Mode Integrated Circuits and Applications (Cat. No. 99EX303)*, Jul. 26-28, 1999, pp. 147-150.

Texas Instruments Inc., "TMS320C54x DSP Reference Set, vol. 1: CPU and Peripherals", Literature No. SPRU131F, Apr. 1999, pp. 2-1 through 2-16 and 4-1 through 4-29.

Tisserand, A., et al., "An on-line arithmetic based FPGA for low power custom computing " *Field Programmable Logic and Applications, 9th International Workshop, FPL'99, Proceedings (Lecture Notes in Computer Science vol. 1673)*, Lysaght, P., et al., eds., Aug. 30-Sep. 1, 1999, pp. 264-273.

Tralka, C., "Embedded digital signal processor (DSP) modules in programmable logic devices (PLDs)," *Elektronik*, vol. 49, No. 14 , Jul. 11, 2000, pp. 84-96.

Valls, J., et al., "A Study About FPGA-Based Digital Filters," *Signal Processing Systems, 1998*, SIPS 98, 1998 IEEE Workshop, Oct. 10, 1998, pp. 192-201.

"Virtex-II 1.5V Field-Programmable Gate Arrays", *Xilinx*, Jan. 25, 2001, module 2 of 4.

"Virtex-II 1.5V Field-Programmable Gate Arrays", *Xilinx*, Apr. 2, 2001, module 1 of 4

"Virtex-II 1.5V Field-Programmable Gate Arrays", *Xilinx*, Apr. 2, 2001, module 2 of 4

Walters, A.L., "A Scaleable FIR Filter Implementation Using 32-bit Floating-Point Complex Arithmetic on ,a FPGA Based Custom Computing Platform," Allison L. Walters, Thesis Submitted to the Faculty of Virginia Polytechnic Institute and State University, Jan. 30, 1998.

Wenzel, L., "Field programmable gate arrays (FPGAs) to replace digital signal processor integrated circuits," *Elektronik* , vol. 49, No. 5, Mar. 7, 2000, pp. 78-86.

"Xilinx Unveils New FPGA Architecture to Enable High-Performance, 10 Million System Gate Designs'", *Xilinx*, Jun. 22, 2000.

"Xilinx Announces DSP Algorithms, Tools and Features for Virtex-II Architecture", *Xilinx*, Nov. 21, 2000.

Xilinx Inc., "Virtex-II 1.5V Field-Programmable Gate Arrays", Advance Product Specification, DS031-2 (v1.9), Nov. 29, 2001, Module 2 of 4, pp. 1-39.

Xilinx Inc., "Using Embedded Multipliers", Virtex-II Platform FPGA Handbook, UG002 (v1.3), Dec. 3, 2001, pp. 251-257.

Xilinx, Inc., "A 1D Systolic FIR," copyright 1994-2002, downloaded from http://www.iro.umontreal.ca/~aboulham/F6221/Xilinx%20A%201D%20systolic%20FIR.htm.

Xilinx, Inc., "The Future of FPGA's," White Paper, available Nov. 14, 2005 for download from http://www.xilinx.com/prs_rls,5yrwhite.htm.

Weisstein, E.W., "Karatsuba Multiplication," *MathWorld—A Wolfram Web Resource* (Dec. 9, 2007), accessed Dec. 11, 2007 at http://mathworld.wolfram.com/KaratsubaMultiplication.html.

Altera Corporation, "Digital Signal Processing (DSP)," *Stratix Device Handbook*, vol. 2, Chapter 6 and Chapter 7, v1.1 (Sep. 2004).

Altera Corporation, "DSP Blocks in Stratix II and Stratix II GX Devices," *Stratix II Device Handbook*, vol. 2, Chapter 6, v4.0 (Oct. 2005).

Underwood, K. "FPGAs vs. CPUs: Trends in Peak Floating-Point Performance," *Proceedings of the 2004 ACM/SIGDA 12th International Symposium on Field Programmable Gate Arrays*, pp. 171-180, Feb. 22-24, 2004.

Xilinx Inc., " XtremeDSP Design Considerations User Guide," v 1.2, Feb. 4, 2005.

Altera Corporation, "Stratix II Device Handbook, Chapter 6—DSP Blocks in Stratix II Devices," v1.1, Jul. 2004.

Altera Corporation, "FIR Compiler: MegaCore® Function User Guide," version 3.3.0, rev. 1, pp. 3 11 through 3 15 (Oct. 2005).

Haynes, S.D., et al., "Configurable multiplier blocks for embedding in FPGAs," *Electronics Letters*, vol. 34, No. 7, pp. 638-639 (Apr. 2, 1998).

Kim, Y., et al., "Fast GPU Implementation for the Solution of Tridiagonal Matrix Systems," *Journal of Korean Institute of Information Scientists and Engineers*, vol. 32, No. 12, pp. 692-704, Dec. 2005.

Govindu, G. et al., "A Library of Parameterizable Floating-Point Cores for FPGAs and Their Application to Scientific Computing," *Proc Int'l Conf. Eng. Reconfigurable Systems and Algorithms (ERSA'05)*, Jun. 2005.

Govindu, G. et al., "Analysis of High-performance Floating-point Arithmetic on FPGAs," *Proceedings of the 18th International Parallel and Distributed Processing Symposium (PDPS'04)*, pp. 149-156, Apr. 2004.

Vladimirova, T. et al., "Floating-Point Mathematical Co-Processor for a Single-Chip On-Board Computer," *MAPLD'03 Conference, D5*, Sep. 2003.

Nakasato, N., et al., "Acceleration of Hydrosynamical Simulations using a FPGA board", *The Institute of Electronics Information and Communication Technical Report CPSY2005-47*, vol. 105, No. 515, Jan. 17, 2006.

Osana, Y., et al., "Hardware-resource Utilization Analysis on an FPGA-Based Biochemical Simulator ReCSiP", *The Institute of Electronics Information and Communication Technical Report CPSY2005-63*, vol. 105, No. 516, Jan. 18, 2006.

Altera Corporation, "Advanced Synthesis Cookbook: A Design Guide for Stratix II, Stratix III and Stratix IV Devices," Document Version 3.0, 112 pgs., May 2008.

deDinechin, F. et al., "Large multipliers with less DSP blocks," retrieved from http://hal-ens-lyon.archives-ouvertes.fr/ens1-00356421/en/, 9 pgs., available online Jan. 2009.

Wajih, E.-H.Y. et al., "Efficient Hardware Architecture of Recursive Karatsuba-Ofman Multiplier," *3rd International Conference on Design and Technology of Integrated Systems in Nanoscale Era*, 6 pgs., Mar. 2008.

Zhou, G. et al., "Efficient and High-Throughput Implementations of AES-GCM on FPGAs," *International Conference on Field-Programmable Technology*, 8 pgs., Dec. 2007.

Martinson, L. et al., "Digital Matched Filtering with Pipelined Floating Point Fast Fourier Transforms (FFT's)" *IEEE Transactions on Acoustics, Speech, and Signal Processing*, vol. ASSP-23, No. 2, pp. 222-234, Apr. 1975.

* cited by examiner

SPECIALIZED PROCESSING BLOCK FOR PROGRAMMABLE LOGIC DEVICE

CROSS REFERENCE TO RELATED APPLICATION

This claims the benefit of commonly-assigned U.S. Provisional Patent Application No. 60/771,989, filed Feb. 9, 2006, which is hereby incorporated by reference herein in its entirety.

BACKGROUND OF THE INVENTION

This invention relates to programmable logic devices (PLDs), and, more particularly, to specialized processing blocks which may be included in such devices.

As applications for which PLDs are used increase in complexity, it has become more common to design PLDs to include specialized processing blocks in addition to blocks of generic programmable logic resources. Such specialized processing blocks may include a concentration of circuitry on a PLD that has been partly or fully hardwired to perform one or more specific tasks, such as a logical or a mathematical operation. A specialized processing block may also contain one or more specialized structures, such as an array of configurable memory elements. Examples of structures that are commonly implemented in such specialized processing blocks include: multipliers, arithmetic logic units (ALUs), barrel-shifters, various memory elements (such as FIFO/LIFO/SIPO/RAM/ROM/CAM blocks and register files), AND/NAND/OR/NOR arrays, etc., or combinations thereof.

One particularly useful type of specialized processing block that has been provided on PLDs is a digital signal processing (DSP) block, which may be used to process, e.g., audio signals. Such blocks are frequently also referred to as multiply-accumulate ("MAC") blocks, because they include structures to perform multiplication operations, and sums and/or accumulations of multiplication operations.

For example, a PLD sold by Altera Corporation, of San Jose, Calif., under the name STRATIX® II includes DSP blocks, each of which includes four 18-by-18 multipliers. Each of those DSP blocks also includes adders and registers, as well as programmable connectors (e.g., multiplexers) that allow the various components to be configured in different ways. In each such block, the multipliers can be configured not only as four individual 18-by-18 multipliers, but also as four smaller multipliers, or as one larger (36-by-36) multiplier. In addition, one 18-by-18 complex multiplication (which decomposes into two 18-by-18 multiplication operations for each of the real and imaginary parts) can be performed. In order to support four 18-by-18 multiplication operations, the block has 4×(18+18)=144 inputs. Similarly, the output of an 18-by-18 multiplication is 36 bits wide, so to support the output of four such multiplication operations, the block also has 36×4=144 outputs.

The operations performed by such DSP blocks frequently require rounding. However, known DSP blocks, including that provided in the aforementioned STRATIX® II PLD, have limited rounding capabilities. Similarly, DSP block operations require the ability to clip the results. Such clipping, or saturation, is necessary to prevent large positive results from overflowing to negative numbers, or highly negative results from overflowing to positive numbers. However, saturation capabilities of known DSP blocks also are limited.

It would be desirable to be able to provide improved rounding and saturation capabilities of the DSP block of a PLD.

SUMMARY OF THE INVENTION

The present invention relates to specialized processing blocks for PLDs wherein the specialized processing blocks have improved rounding and saturation capabilities.

The specialized processing block with which the invention may be used preferably includes a plurality of fundamental processing units instead of discrete multipliers. Each fundamental processing unit preferably includes the equivalent of at least two multipliers and logic to sum the partial products of all of the at least two multipliers. As a result, the sums of the all of the multiplications are computed in a single step, rather than summing the partial products of each multiplier to form individual products and then summing those products. Such a fundamental processing unit can be constructed with an area smaller than that of the individual multipliers and adders. If a single multiplication is required to be performed, one of the multipliers in the fundamental processing unit is used, while the inputs to the other(s) are zeroed out. Nevertheless, because the provision of the fundamental processing unit reduces the area of the specialized processing block, efficiency is improved.

In a preferred embodiment, the fundamental processing unit includes the equivalent of two 18-by-18 multipliers and one adder so that it can output the sum of the two multiplication operations. While each of the 18-by-18 multipliers can be configured for a smaller multiplication operation (e.g., 9-by-9 or 12-by-12), the integrated nature of the fundamental processing unit means that the individual multiplier outputs are not accessible. Only the sum is available for use by the remainder of the specialized processing block. Therefore, to obtain the result of a single non-complex multiplication that is 18 bits-by-18 bits or smaller, an entire fundamental processing unit must be used. The second multiplier, which cannot be disengaged, simply has its inputs zeroed.

The specialized processing block with which the invention may be used preferably also has one or more additional adders for additional processing of the output of the fundamental processing unit, as well as optional pipeline registers and a flexible output stage. Therefore the specialized processing block preferably can be configured for various forms of filtering and other digital signal processing operations. In addition, the specialized processing block preferably also has the capability to feed back at least one of its outputs as an input, which is useful in adaptive filtering operations, and to chain both inputs and outputs to additional specialized processing blocks.

The specialized processing block according to the invention preferably includes flexible rounding circuitry and flexible saturation circuitry. The rounding and saturation circuitry preferably are in a single rounding/saturation block. However, in certain embodiments, as described below, the rounding and saturation circuitry may be separate.

The flexible rounding circuitry according to the invention preferably allows the user to select between rounding to the nearest integer and rounding to the nearest even. As is known, rounding to the nearest even operates identically to rounding to the nearest integer, except when the remainder is exactly equal to one-half. In rounding to the nearest integer, when the remainder is exactly equal to one-half, the result always is rounded up to the next integer. In rounding to the nearest even, when the remainder is exactly equal to one-half, the result is rounded up if the next integer is even, but rounded down if the next integer is odd. The flexible rounding circuitry preferably also allows the user to select the bit position of the result at which rounding takes place. The location of the flexible rounding circuitry within the specialized processing block preferably also is selectable so that critical timing paths are not affected unnecessarily by rounding operations.

The flexible saturation circuitry according to the invention preferably allows the user to select between symmetrical and asymmetrical clipping of the result. As is known, in certain types of numerical representations, such as one's-complement representations, a numerical variable that ranges up to $2^n-1$ ranges down to $-(2^n-1)$, and thus ranges symmetrically. However, in other types of numerical representations, such as two's-complement representations, a numerical variable that ranges up to $2^n-1$ ranges down to $-(2^n)$, and thus ranges asymmetrically. In clipping an arithmetic result, it may be desirable for the result to be clipped symmetrically regardless of the type of representation, and the present invention preferably allows the user to select such a result. The flexible saturation circuitry preferably also allows the user to select the bit position of the result at which clipping takes place. The location of the flexible saturation circuitry within the specialized processing block preferably also is selectable so that critical timing paths are not affected unnecessarily by clipping operations.

Therefore, in accordance with the present invention, there is provided a specialized processing block for a programmable logic device. The specialized processing block includes arithmetic circuitry for providing products of inputs and sums of those products to output a result. The specialized processing block further includes one or both of (1) rounding circuitry for selectably rounding the result to one of (a) a nearest integer, and (b) a nearest even integer, and (2) saturation circuitry for clipping said result to a value inside a range of values on which said arithmetic circuitry operates.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
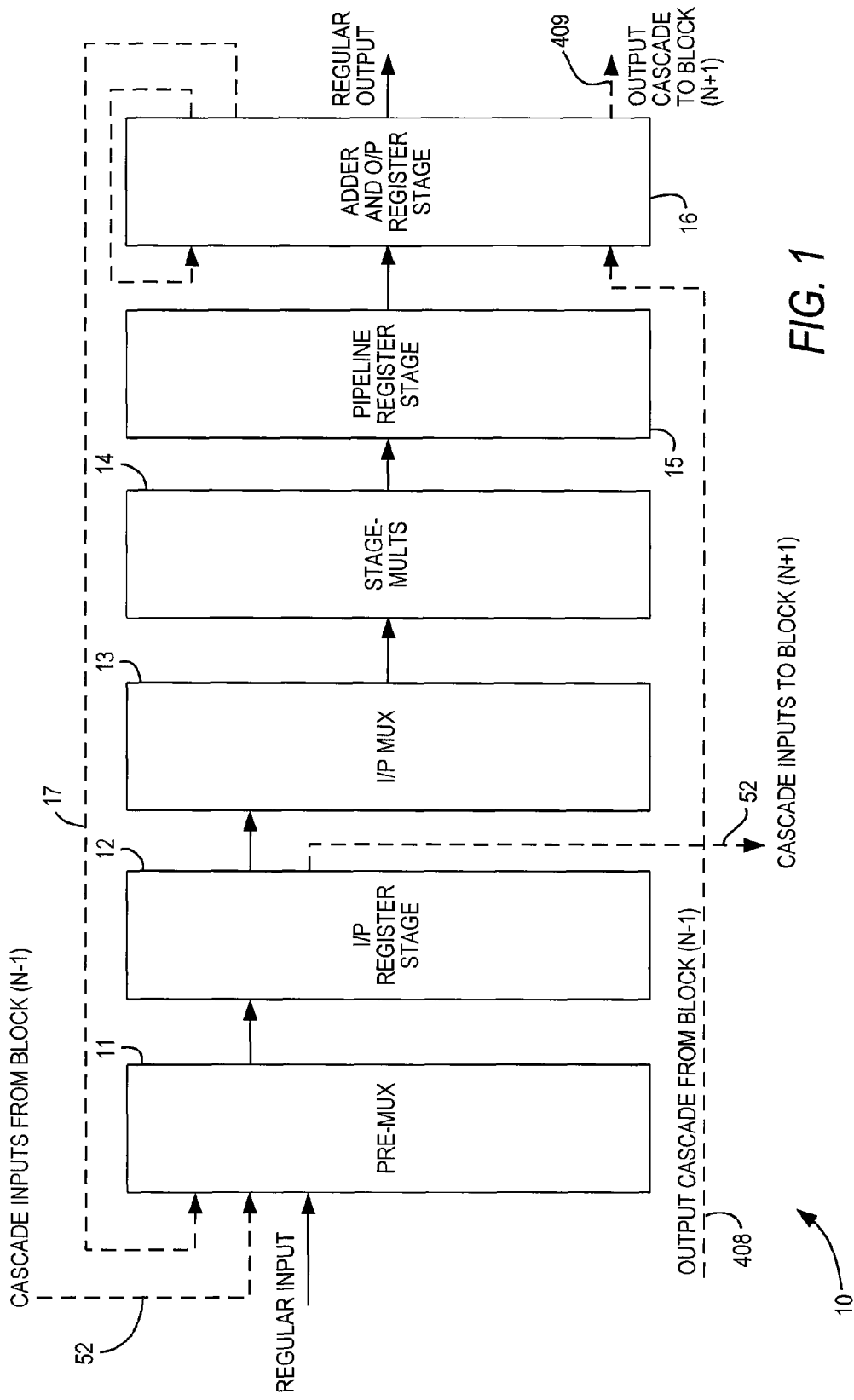
FIG. 1 is a high-level diagram of one preferred embodiment of a specialized processing block in accordance with the present invention.

Rounding is a technique for reducing the precision of a number by removing a lower-order range of bits from that number's representation and possibly modifying the remaining portion of the number to more accurately represent its former value. For example, if the original number has N bits of precision, the rounded number may have only M bits of precision (where N>M), meaning that N-M bits of precision are removed from the number in the process of rounding.

The round-to-nearest method returns the closest number to the original. This is commonly referred to as "round-to-nearest-integer" (RNI), but as it works for numbers less than one as well, "round-to-nearest" is more appropriate. By convention, according to this method an original number lying exactly halfway between two numbers (and therefore having two numbers that are "nearest") always rounds up to the larger of the two. For example, when rounding the 3-bit, two's complement fraction 0.25 (binary 0.01) to the nearest 2-bit two's complement fraction, this method returns 0.5 (binary 0.1). The original fraction lies exactly midway between 0.5 and 0.0 (binary 0.0), so this method rounds up. Because it always rounds up, this method is also called "biased rounding."

The "convergent rounding," or "round-to-nearest-even" (RNE), method also returns the closest number to the original. However, in cases where the original number lies exactly halfway between two numbers, this method returns the nearest even number, which in a binary representation is the one containing a least significant bit of 0. So for the example above, the result would be 0.0, since that is the even-numbered choice as between 0.5 and 0.0. Because it rounds either up or down based on the surrounding values rather than always rounding in the same direction, this method is also called "unbiased rounding."

Some examples are shown in the following table, in which 6-bit numbers are rounded to 4-bits of precision:

| Original number (decimal equivalent) | Sign | First 4 bits odd or even? | Last two bits </> one-half? | RNI Result (decimal equivalent) | RNE Result (decimal equivalent) |
|---|---|---|---|---|---|
| 010111 (23) | + | Odd (LSB = 1) | Greater (.11B = .75) | 011000 (24) | 011000 (24) |
| 001001 (9) | + | Even (LSB = 0) | Less (.01B = .25) | 001000 (8) | 001000 (8) |
| 001010 (10) | + | Even (LSB = 0) | Equal (.10B = .50) | 001100 (12) | 001000 (8) |

-continued

| Original number (decimal equivalent) | Sign | First 4 bits odd or even? | Last two bits </> one-half? | RNI Result (decimal equivalent) | RNE Result (decimal equivalent) |
|---|---|---|---|---|---|
| 001110 (14) | + | Odd (LSB = 1) | Equal (.10B = .50) | 010000 (16) | 010000 (16) |
| 110111 (−9) | − | Odd (LSB = 1) | Greater (.11B = .75) | 111000 (−8) | 111000 (−8) |
| 101001 (−23) | − | Even (LSB = 0) | Less (.01B = .25) | 101000 (−24) | 101000 (−24) |
| 110110 (−10) | − | Odd (LSB = 1) | Equal (.10B = .50) | 111000 (−8) | 111000 (−8) |
| 110010 (−14) | − | Even (LSB = 0) | Equal (.10B = .50) | 110100 (−12) | 110000 (−16) |

When the result of an arithmetic operation exceeds the range of the destination storage, important information can be lost. Saturation is a technique used to contain the quantity within the values that the destination storage can represent. When a value is computed that exceeds the capacity of the destination storage, then the value written to the register is "saturated at" or "clipped to" the largest value that the storage can hold with the same sign as the original.

Thus, for example, if an operation would otherwise cause a positive value to overflow and become negative, saturation limits the result to the maximum positive value for the storage being used. Conversely, if an operation would otherwise cause a negative value to overflow and become positive, saturation limits the result to the most negative value for the storage.

For example, if a 16-bit register containing 0x1000 (decimal integer +4096) was shifted left 3 places without saturation, it would overflow to 0x8000 (decimal −32,768). With saturation, however, a left shift of 3 or more places would always produce the largest positive 16-bit number, 0x7FFF (decimal +32,767). In the two's complement example above, where the maximum positive number is $2^n-1$ and the most negative number is $-(2^n)$, the saturation or clipping feature would clip the upper and lower values at $2^n-1$ and $-(2^n)$ if asymmetrical, but at $2^n-1$ and $-(2^n-1)$ if symmetrical, even though a negative value of $-(2^n)$ is available. Thus, for a 16-bit case:

Asymmetric saturation: Max=0x7FFF, Min=0x8000
Symmetric saturation: Max=0x7FFF, Min=0x8001

The invention will now be described with reference to FIGS. 1-11.

Figure 2:
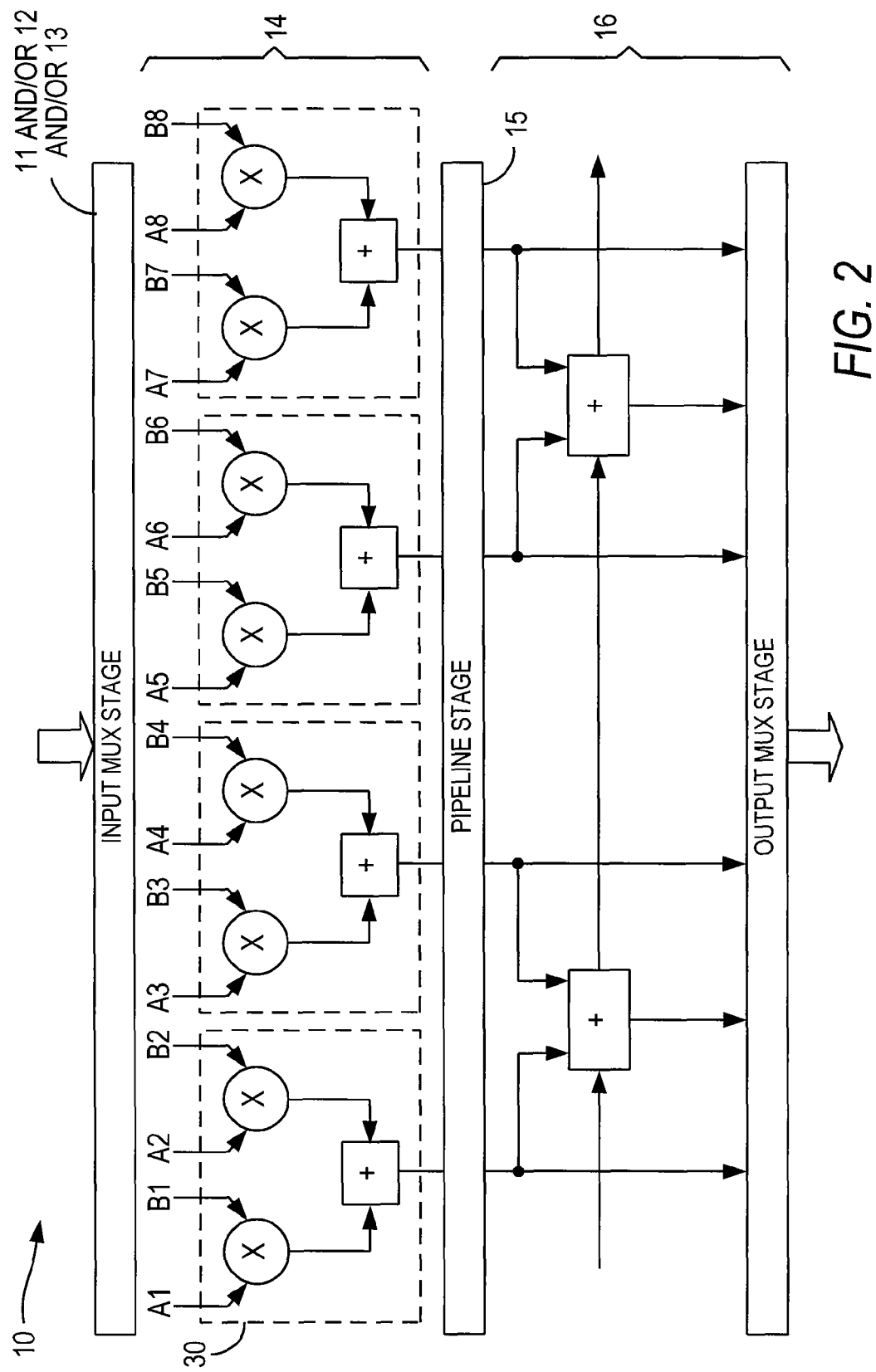
FIG. 2 is a functional diagram of the specialized processing block of FIG. 1.

FIG. 1 shows a high-level diagram of one preferred embodiment 10 of a specialized processing block according to the invention, while FIG. 2 is a functional diagram of the same embodiment 10.

As seen in FIG. 1, specialized processing block 10 includes optional input pre-MUX stage 11, optional input register stage 12, optional input multiplexing stage 13, multiplication stage 14, optional pipeline register stage 15 and adder/output stage 16.

The function of input pre-MUX stage 11, if provided, is to format the regular inputs, loopback inputs and cascade inputs (see below) into a form suitable for registering.

Regular inputs do not require any specific formatting. Cascade inputs may be a one-register delayed version of a previous input, and therefore may need formatting accordingly. However, such formatting also can be done in programmable logic of the programmable logic device of which specialized processing block 10 is a part, so if formatting of cascade inputs is the only pre-MUX function required, input pre-MUX stage 11 can be omitted or, if provided, bypassed. The loopback input 17 may be arranged so that it is always connected to a particular multiplier or group of multipliers. The formatting performed by input pre-MUX stage 11 may include the direction of particular inputs to particular bit locations depending on the function to be performed by specialized processing block 10. The formatting may be carried out in one embodiment according to a stored table identifying the various possible operations (e.g., simple or complex multiplications of various sizes, shifting operations, rotation operations, etc.) and specifying the corresponding formatting required.

The output of input pre-MUX stage 11, if provided, may be registered by optional input register stage 12. If there in no input pre-MUX stage 11, then the input register function, if needed, can be performed in the programmable logic portion of the programmable logic device of which block 10 is a part. Therefore, input register stage 12 is considered optional. Input register stage 12, even if provided, preferably can be optionally bypassed in cases where unregistered outputs are needed or desired.

Input multiplexing stage 13, if provided, takes registered or unregistered inputs from input pre-MUX stage 11 and inputs potentially from elsewhere in the programmable logic device and formats the data for the different operational modes. In that respect it is similar to input pre-MUX stage 11, and therefore frequently if one of input pre-MUX stage 11 and input multiplexing stage 13 is provided, the other will not be provided.

As one example of the type of formatting performed by input pre-MUX stage 11 or input multiplexing stage 13, consider an 18-by-18 complex multiplication in which:

$$\text{Real Result} = Re[(a+jb) \times (c+jd)] = (ac-bd)$$

$$\text{Imag Result} = Im[(a+jb) \times (c+jd)] = (ad+bc)$$

This complex operation requires four 18-by-18 multiplications and hence eight 18-bit inputs, but because there are only four unique 18-bit shared inputs, input multiplexing stage 13 will take the inputs a, b, c and d and perform the necessary duplication so those four inputs are properly routed to the correct multiplier inputs for each of the real and imaginary calculations. Similarly, for 9- and 12-bit mode operations, input pre-MUX stage. 11 and/or input multiplexing stage 13 ensures correct alignments of the input bits in order to obtain correct results.

Multiplication stage 14 preferably includes a plurality of fundamental processing units as described above. In a preferred embodiment, each specialized processing block 10 (see FIG. 2) includes four fundamental processing units 30, meaning that it can perform up to eight multiplications in groups of two multiplications that are summed together. In that embodiment, the fundamental processing units in specialized processing block 10 preferably are grouped into identical half-blocks, so that each half-block in its own right can be considered a specialized processing block within the invention.

Each fundamental processing unit preferably includes the functionality for a sum of two 18-by-18 multiplications. The fundamental processing units preferably are all identical, but in some embodiments, it is possible to provide a negation function on only some inputs of some multipliers, as maybe required for, e.g., complex multiplication where, as is apparent above, subtraction may be required. Alternatively, the negation function may be provided in the adder portion of the fundamental processing unit, so that one or more adders can also perform subtraction.

Figure 3:
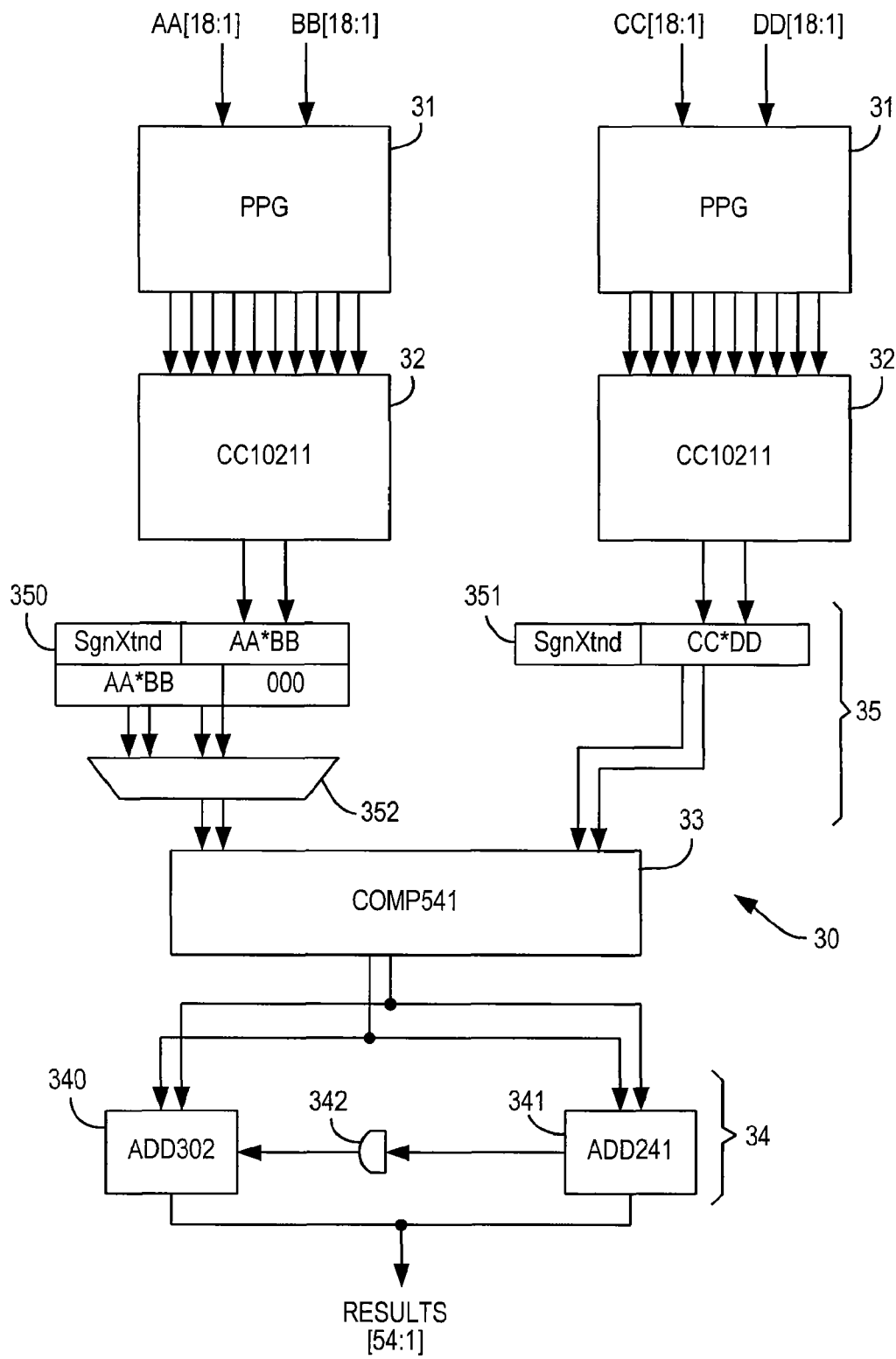
FIG. 3 is a block diagram of a preferred embodiment of a fundamental processing unit for a specialized processing block in accordance with the present invention.

The structure of a preferred embodiment of a fundamental processing unit is shown in FIG. 3. Each fundamental processing unit 30 preferably supports a sum of two 18-by-18 multiplications and preferably includes two partial product generators 31, two ten-vector-to-two-vector compressors 32, a 4-to-2 compressor 33, and two carry-propagate adders 34. Adders 34 preferably include one 30-bit adder 340 and one 24-bit adder 341, which are selectably connectable by a control signal 342. For smaller multiplications such as 9-by-9 or 12-by-12, only 24 bits are required, so the two adders can be disconnected to allow two independent multiplications. For larger multiplications such as 18-by-18, the two adders 34 should be linked as a single adder.

Each partial product generator 31 preferably creates nine 20-bit signed Booth-encoded vectors (Booth-encoding is a known technique that can reduce the number of partial products), as well as a 17-bit unsigned carry vector (negative partial products are in ones-complement format, with the associated carry-in bit in the carry vector). An additional 19-bit signed partial product may be generated in the case of unsigned multipliers (which preferably will always be zero for signed multipliers). Although preferably up to 11 vectors may be generated, the carry bits preferably can be combined with the partial product vectors, requiring only 10 vectors to be compressed.

The partial products preferably are compressed down to two 39-bit vectors (36 bits plus sign extension bits). Any sign extensions should be preserved properly past the 36-bit 18-by-18 multiplier boundary, so that any sign extensions can be valid up to the 72-bit 36-by-36 multiplier boundary (in a case where two fundamental processing units are combined to implement a 36-by-36 multiplication as described below). After compression, the results preferably are processed in mux-and-shift circuitry 35, which preferably include combinatorial logic where any sign-extension, zero-filling or shifting of the results before addition, as may be required depending on the operation being performed, can be accomplished prior to final combination of the results in 4-to-2 compressor 33 and carry-propagate adders 34. For each of circuits 350, 351, the inputs preferably are two 39-bit vectors for a total of 78 input bits, while the outputs preferably are two 54-bit vectors for a total of 108 bits. The extra thirty bits are the result of sign extension, zero-filling, and or shifting. Multiplexer 352 indicates a selection between sign extended or zero-filled results. The four 54-bit vectors are input to compressor 33 which outputs two 54-bit vectors, which are added in adders 34 to produce a 54-bit output.

As discussed above, because the partial products from both multipliers are added at once, the two multipliers of a fundamental processing unit cannot be used for two independent multiplications, but a single multiplication can be carried out by zeroing the inputs of the second multiplier.

For smaller multiplications, independent subset multipliers (9-by-9 and 12-by-12 cases) may be handled as follows:

For two 9-by-9 multiplications, the first 9-by-9 multiplication preferably is calculated using the most significant bits (MSBs) of the first multiplier (on the left in FIG. 3), and the second 9-by-9 multiplication preferably is calculated using the least significant bits (LSBS) of the second multiplier (on the right in FIG. 3). The MSBs of the right multiplier are filled with the sign extensions of the corresponding values, as appropriate. The outputs of the left multiplier (sum and carry vectors) are left-shifted by 18 bits. The two multiplier outputs preferably are then compressed together and the two resulting final vectors are then added with the two adders 34, which are not connected for this operation. The first 9-by-9 result preferably will be output on the MSBs of the left (30-bit) adder 340, while the second 9-by-9 result preferably will be output on the LSBs of the right (24-bit) adder 341.

Independent 12-by-12 multiplications can be calculated in a manner similar to a 9-by-9 multiplication, using the MSB/LSB method.

In both cases, preferably the right multiplier outputs are zeroed above 24 bits to prevent any interference with the independent left multiplier result.

In the case of summed multiplications, regardless of the precision, all inputs preferably are shifted to occupy the MSBs of the multipliers used, and the output vectors preferably are not shifted. The output vectors, however, preferably are fully sign-extended, so that sign-extension out of the adders 34 can be used for the full width of the accumulator (below).

Preferably, for complex multiplications and other operations that require subtraction of products, the adder inputs can be negated (effectively making the adder an adder/subtractor). Alternatively, however, one or more of the multipliers can be provided with the ability to selectively negate its output vectors, by inverting the input (ones' complement), and adding the multiplicand to the result. The multiplicand addition can be performed in the compression of the partial products, so that the negation can be implemented before adders 34.

Pipeline register stage 15, which preferably may be bypassed at the user's option, preferably allows outputs of multiplication stage 14 to be registered prior to further addition or accumulation or other processing.

Figure 4:
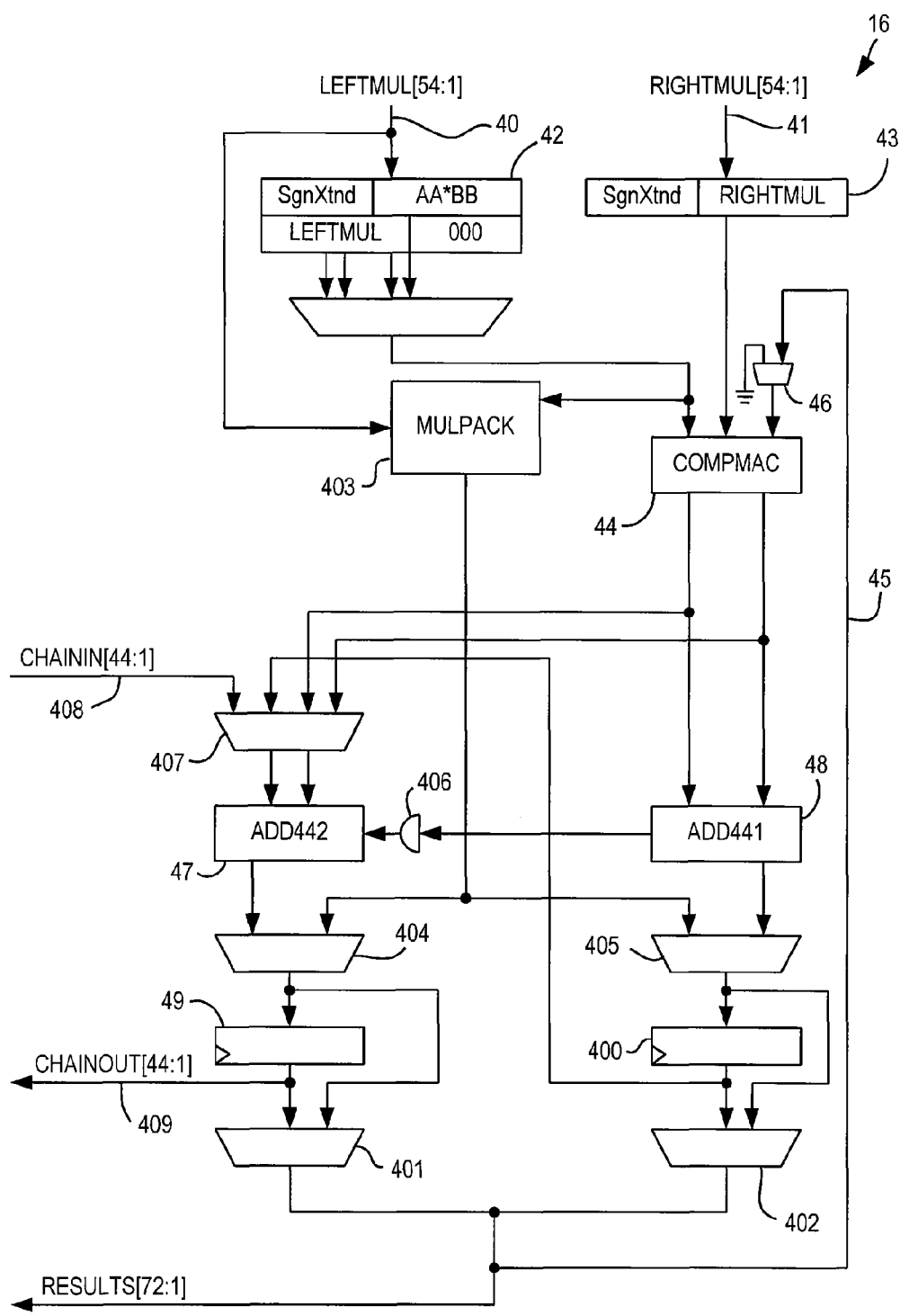
FIG. 4 is a preferred embodiment of an output stage of a specialized processing block in accordance with the present invention

Adder/output stage 16 preferably selectively shifts, adds, accumulates, or registers its inputs, or any combination of the above. Its inputs preferably are the outputs of the two fundamental processing units in specialized processing block 10. As seen in FIG. 4, those two inputs 40, 41 are input to respective register/shifter units 42, 43, which optionally may shift or sign extend inputs 40, 41. In a preferred embodiment, each of inputs 40, 41 is a 54-bit vector, which is shifted or sign-extended to create a respective 72-bit vector.

The outputs of units 42, 43 preferably are input to a 3:2 compressor 44, along, preferably, with the output 45 of stage 16 itself. This feedback provides an accumulation function to specialized processing block 10. Preferably, the fed-back output 45 passes through multiplexer 46, which can alternatively select a zero (e.g., ground) input when accumulation is not necessary or desired.

The outputs of compressor 44 are provided (through appropriate multiplexers as described below) to two adders 47, 48, which may be chained together under programmable control, depending on the use to which they are to be put, as described below. The outputs of adders 47, 48 preferably may be registered in registers 49, 400 or not, as determined by multiplexers 401, 402. Registered or not, outputs 47, 48 preferably make up the output vector of specialized processing block 10. As an alternative path, multiplexers 403, 404, 405 allow adders 47, 48 to be bypassed where the outputs of fundamental processing units 30 are to be output without further processing.

In the case, described above, where each fundamental processing unit 30 can perform a sum of two 18-by-18 multiplications, two fundamental processing units 30 can perform a 36-by-36 multiplication, which, as is well known, can be decomposed into four 18-by-18 multiplications. In such a case, two compressed 72-bit vectors preferably are output by compressor 44 and preferably are added together by the two 44-bit adders 47, 48, which are programmably connected together for this mode by AND gate 406. The upper 16 bits may be ignored in this mode.

In other modes with narrower outputs, where adders 47, 48 need not be connected together, adders 47, 48 optionally may be arranged to chain the output of specialized processing block 10 with the similar output of another specialized processing block 10. To facilitate such a mode, the output of register 400, for example, may be fed back to 4:2 multiplexer 407, which provides two inputs to adder 47. The other inputs to multiplexer 407 may be the two vectors output by compressor 44 and chain-in input 408 from another specialized processing block 10, which may be provided via chain-out output 409 from register 49 of that other specialized processing block 10.

Thus, in chaining mode, 44-bit adder 48 may be used to add together the results within one of specialized processing blocks 10—configured, e.g., as a single multiplier, a sum of multipliers, or an accumulator.—with the results of the previous block. By using multiplexer 407 to select as inputs to adder 47 the output of adder 48 and the output of another specialized processing block 10, the output of the current specialized processing block 10 can be the chained sum of the outputs of the current and previous specialized processing blocks 10. If the chaining mode is used, only a 44-bit accumulator is available, which will still give a 6-bit to 8-bit guard band, depending on the number of multipliers. However, as is apparent, the chaining mode is not available for the 36-bit mode, in which both adders 47, 48 are needed to obtain the result of a single specialized processing block 10.

The output paths may be slightly different depending on the mode of operation. Thus, multiplexers 401, 402 allow selection of registered or unregistered outputs of adders 47, 48. It will be appreciated, however, that, as shown, registered outputs preferably are used in cascade or chained mode.

In addition, at least one output may be looped back, as at 17, to an input of specialized processing block 10. Such a loopback feature may be used, for example, if specialized processing block 10 is programmably configured for adaptive filtering. Although multiple loopbacks may be provided, in a preferred embodiment, one loopback 17 to single multiplier or group of multipliers is provided.

Figure 5:
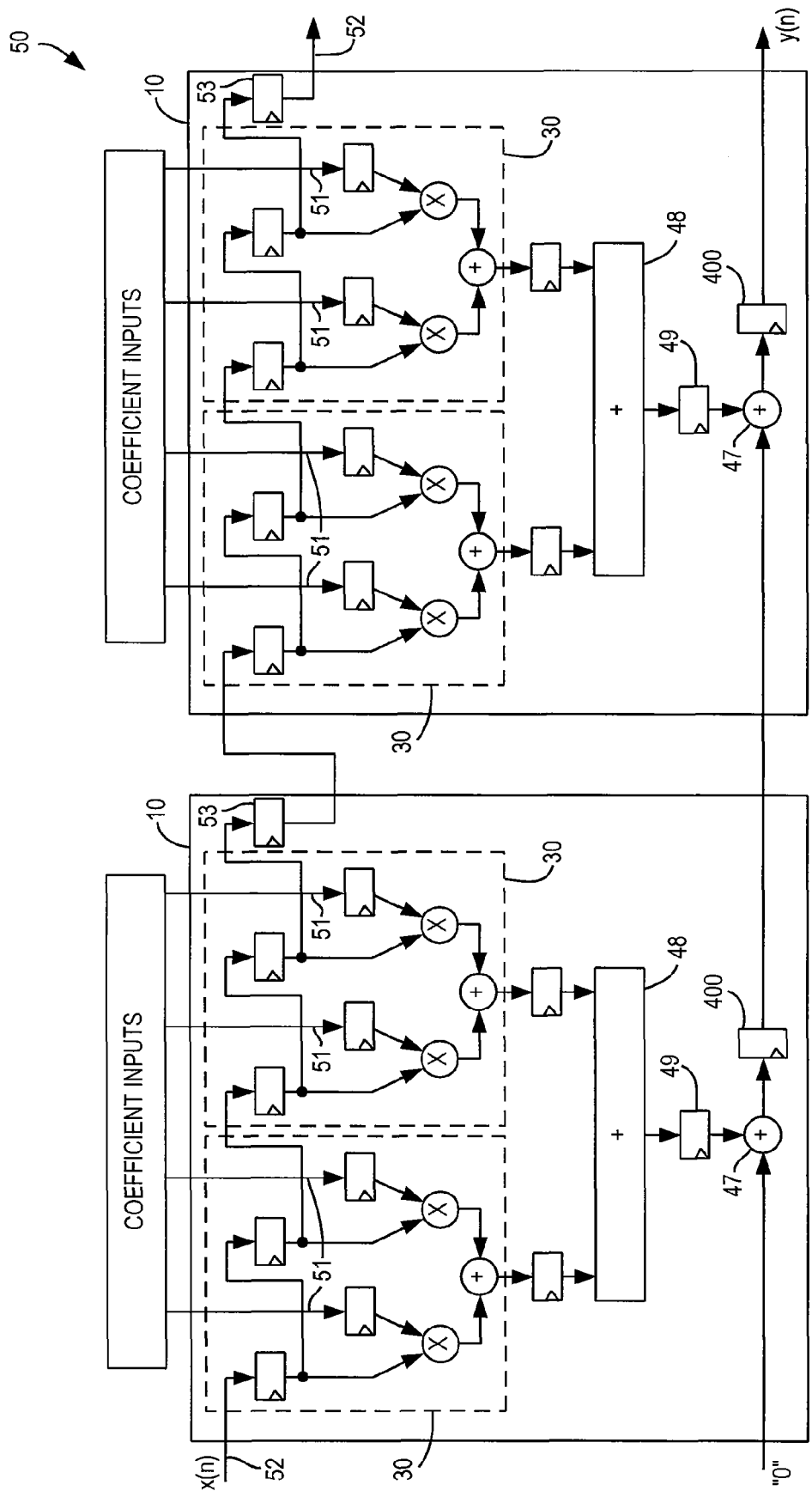
FIG. 5 is a functional diagram of a specialized processing block in accordance with a first preferred embodiment of the present invention configured as part of a finite impulse response filter.

The specialized processing block 10 of the present invention may be programmably configured as a long chain finite impulse response (FIR) filter. As shown in FIG. 5, four fundamental processing units 30 are configured as part of such a FIR filter 50. As discussed above, this may be considered to be either one or two specialized processing blocks 10. As shown, each of adders 48 is used to add the results of four multiplications, with adders 47 used in the chaining or cascade mode described above to add together the outputs of adders 48 (as well, possibly, as the outputs of adders 48 of other specialized-processing blocks 10) to form a long FIR filter. The coefficients of the FIR filter are input at 51, while the data to be filtered are input via register chain 52, preferably formed in one of input pre-MUX stage 11, input register stage 12 or input multiplexing stage 13. To account for delay introduced by the output cascade chain, at least one extra delay 53 (e.g., in the form of an extra register) preferably is provided in input cascade chain 52. Preferably, the number of delays corresponds to the number of adders 47 or, more particularly, output registers 409 for which delays 53 compensate. Generally, this would amount to one delay 53 for each pair of fundamental processing units 30. As discussed above, although in a preferred embodiment two fundamental processing units 30 make up a half-block, they also could be considered a specialized processing block 10 in their own right.

As discussed above, rounding and saturation circuitry preferably also is provided in specialized processing block 10. As discussed, the rounding circuitry preferably allows the user to select between round-to-nearest mode and round-to-nearest-even mode (truncation—i.e., always rounding down—also may be provided as an option). As also discussed, the saturation circuitry preferably allows the user to select between symmetrical and asymmetrical clipping. In addition, the rounding circuitry preferably allows the user to select which bit rounding will occur at and the saturation circuitry preferably allows the user to select which bit saturation will occur at. Insofar as those selections determine the location of the least and most significant bits, respectively, those selections allow the user to determine the width of the output word. Preferably, this is done by providing two respective four-bit variables that can be decoded into respective 16-bit numbers that represent the rounding and saturation locations, respectively.

The calculation of round-to-nearest is trivial as it involves simply adding one-half (i.e., adding 1 in the next most significant position after the rounding position) and then truncating the result (i.e., replacing all values after the rounding position with zeroes).

The calculation of round-to-nearest-even is more complicated, as it involves determining whether the value of the bits beyond the rounding position is exactly one-half or not.

Figure 6:
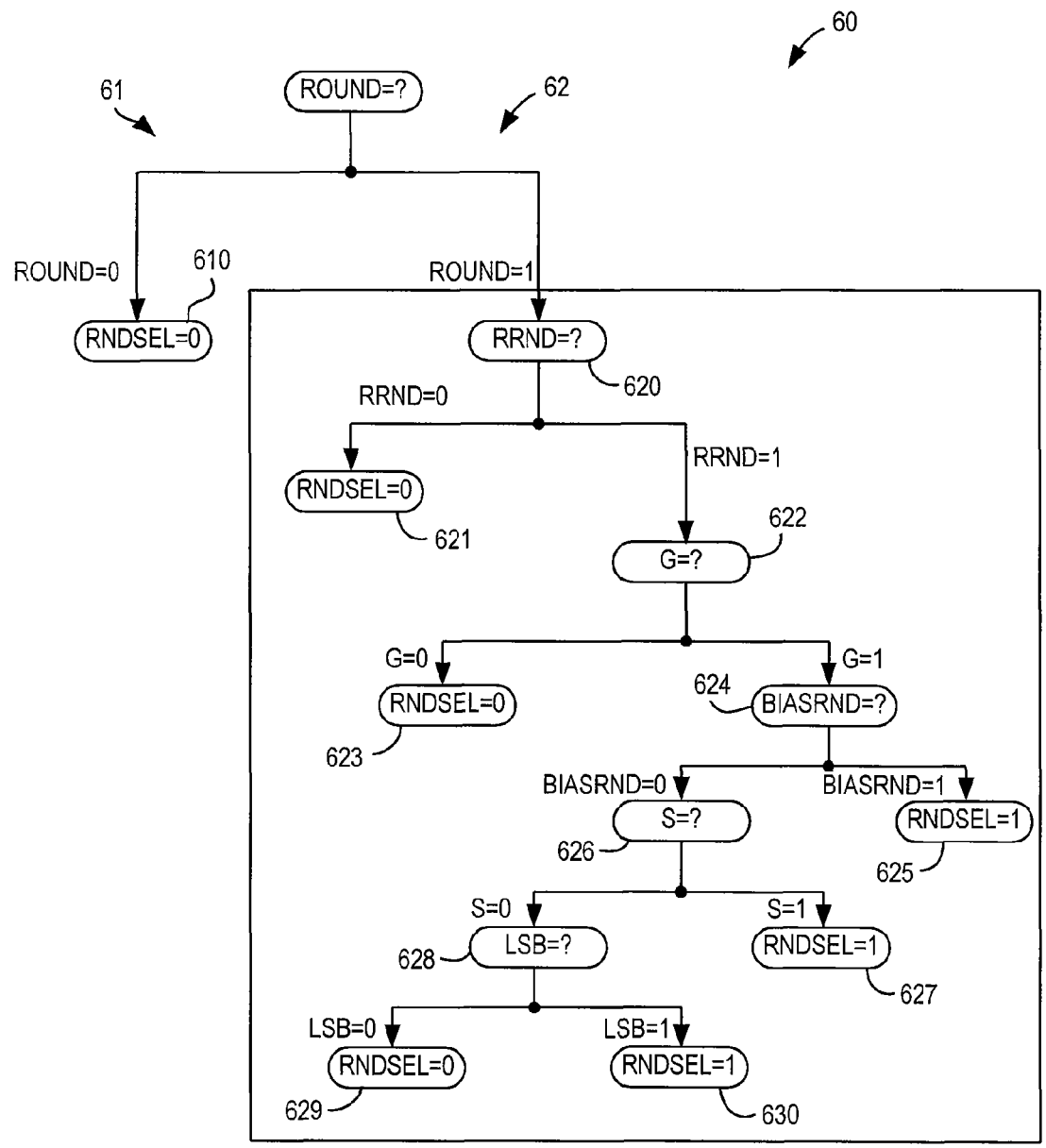
FIG. 6 is a diagram of round-to-nearest-even logic in accordance with the present invention.

The logic 60 for calculating the various types of rounding is shown in FIG. 6. The variable ROUND determines if branch 61 or branch 62 is followed. If ROUND=0, no rounding is to be performed and branch 61 is followed, setting RNDSEL=0 at 610. If ROUND=1, rounding is to be performed and branch 62 is followed, and is repeated for each bit position, with the results being ORed together. Thus, in the preferred 16-bit embodiment, this is done sixteen times and ORed in a 16-bit-wide OR gate.

In branch 62, RRND is the value decoded from the 4-bit number representing the rounding position, LSB is the bit in the rounding position, G is the next most significant bit after the rounding position (i.e., the bit to the right of the rounding position), and S is result of ORing together all bits to the right of G. Thus, for a particular pass through branch 62, if at 620 RRND is 0, then for that bit position there is no rounding and RNDSEL is set to 0 at 621. If at 620 RRND is 1, then for that bit position rounding is to be performed and the value of G is examined at 622.

If G=0, then the remainder beyond LSB is less than one-half and the result should be rounded down (i.e., not rounded but truncated), and at 623 RNDSEL is set to 0. If G=1, then the remainder beyond LSB is greater than or equal to one-half, and further rounding steps depend on whether biased rounding (BIASRND=1) or unbiased rounding (BIASRND=0) is to be performed, as determined at 624.

If biased rounding is to be performed (i.e., BIASRND=1), then the result should be rounded up regardless of whether the remainder is exactly one-half, so RNDSEL is set to 1 at 625.

If unbiased rounding is to be performed (i.e., BIASRND=0), then the result should be rounded up only if the remainder is more than one-half, or if the remainder is exactly one-half but LSB=1. Thus, if BIASRND=0, then at 626 the value of S is examined. If S=1, then the remainder is more than one-half and the result should be rounded, so RNDSEL is set to 1 at 627. If S=0, then the remainder is exactly one-half, so LSB is examined at 628. If LSB=0, rounding to the nearest even means rounding down and RNDSEL is set to 0 at 629. If LSB=1, rounding to the nearest even means rounding up and RNDSEL is set to 1 at 630.

Figure 7:
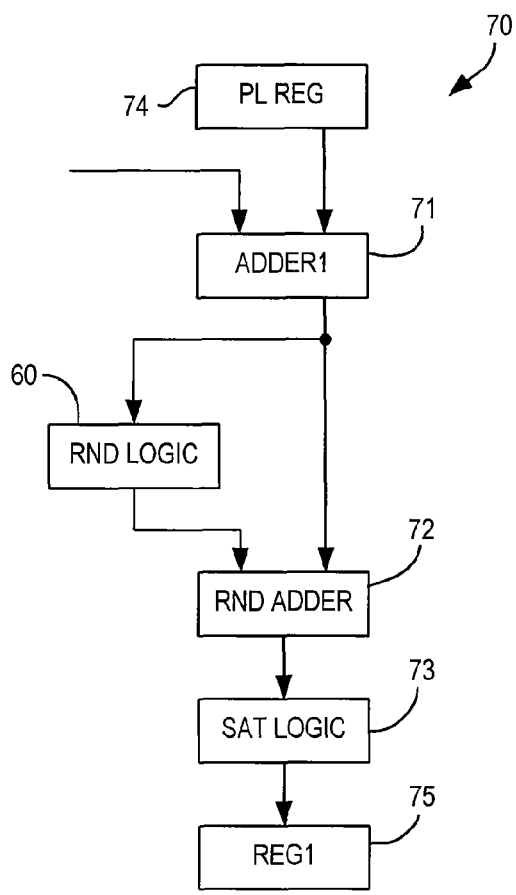
FIG. 7 is a schematic diagram of a portion of a specialized processing block showing rounding and saturation logic in accordance with a first embodiment of the present invention.
Figure 8:
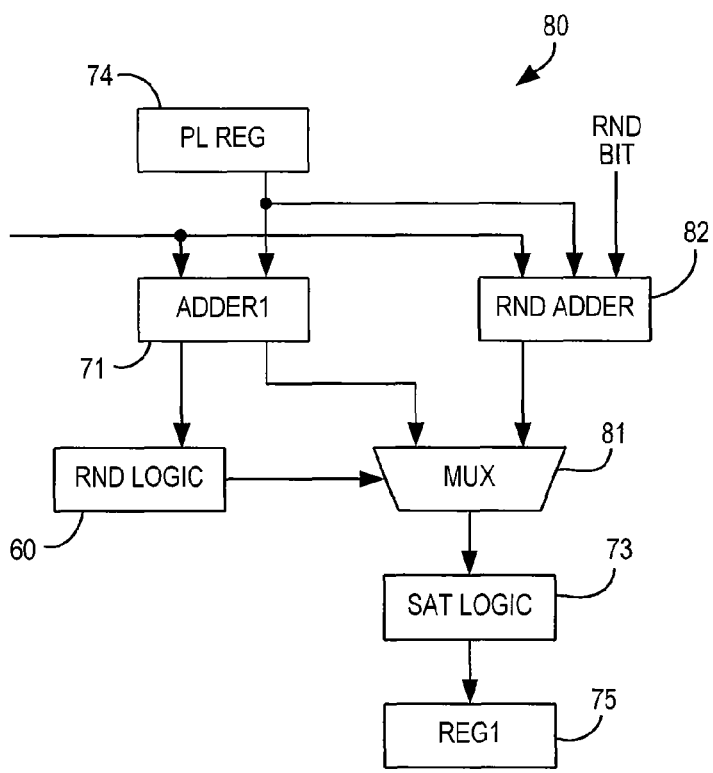
FIG. 8 is a schematic diagram of a portion of a specialized processing block showing rounding and saturation logic in accordance with a second embodiment of the present invention.
Figure 9:
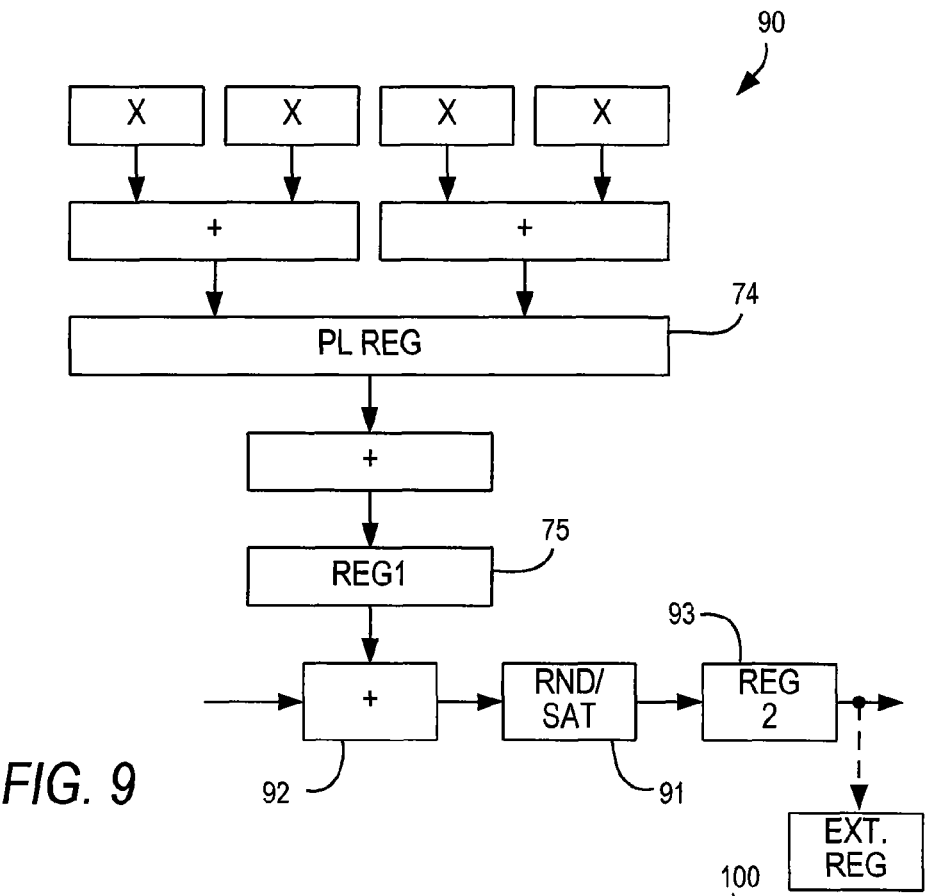
FIG. 9 is a schematic diagram of a portion of a specialized processing block in cascade mode showing location of rounding and saturation logic in accordance with one embodiment of the present invention.
Figure 10:
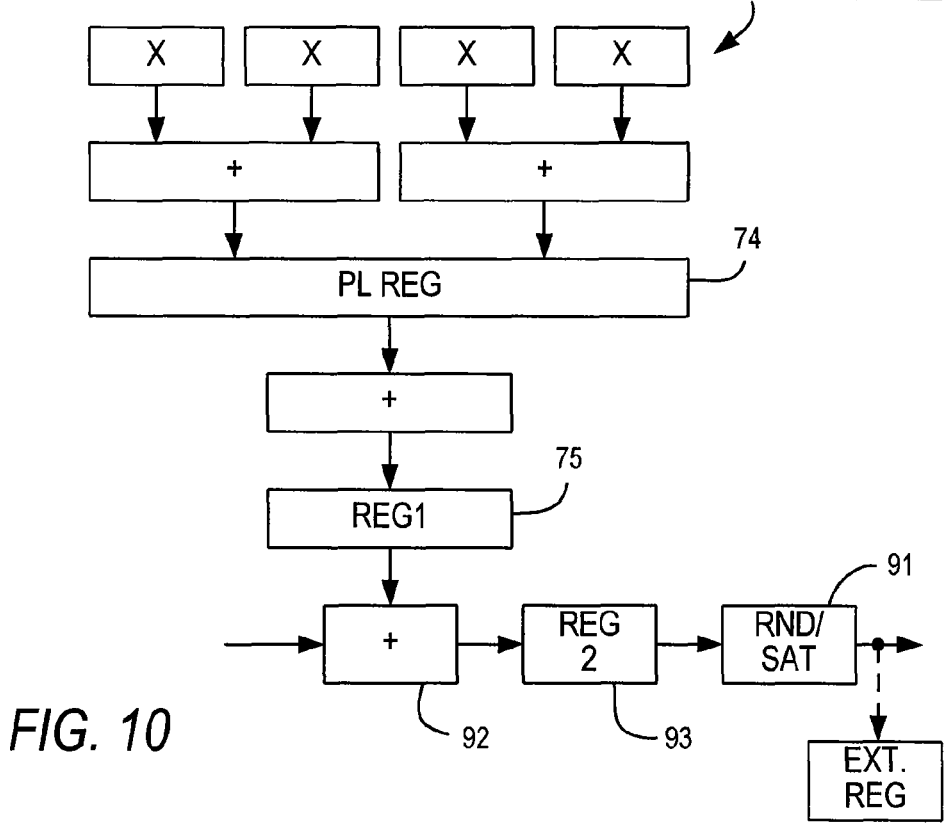
FIG. 10 is schematic diagram of a portion of a specialized processing block in cascade mode showing location of rounding and saturation logic in accordance with another embodiment of the present invention.

The result, RNDSEL, is used, after the ORing of all RNDSEL bits as described above, as the control bit to select between rounded and unrounded values as shown, e.g., in FIGS. 7 and 8. In the embodiment 70 of FIG. 7, which may be programmably implemented in specialized processing block 10, the output of adder 71 is input to both rounding logic 60 and further adder 72. The output of rounding logic 60 is also input to adder 72, and controls whether or not adder 72 adds 1 to the output of adder 71. Because these rounding operations, as well as saturation operations in saturation logic 73, are in a critical path between registers 74, 75, the rounding and saturation operations must be completed within one clock cycle. This limits the maximum clock speed to one in which the rounding and saturation operations can be completed.

Therefore, in embodiment 80 of FIG. 8, which may be programmably implemented in specialized processing block 10, instead of waiting for rounding logic 60 before performing addition 82, addition 71 and addition 82 are carried out simultaneously and the result of rounding logic 60 is used to control multiplexer 81, which selects between adders 71, 81. This look-ahead rounding decreases the time needed to perform rounding operations, and therefore increases the maximum permissible clock speed.

Similar clocking issues come into play when specialized processing block 10 is used in output cascade mode with another specialized processing block 10. As seen in embodiment 90 of FIG. 9, which may be programmably implemented in specialized processing block 10, the rounding and saturation circuitry 91 is located between cascade adder 92 and register 93. Once again, that places it in the critical path for register timing. Therefore, in the embodiment 100 shown in FIG. 10, which may be programmably implemented in specialized processing block 10, rounding and saturation circuitry 91 is placed after register 93. While this removes rounding and saturation circuitry 91 from the critical path, it increases the time-to-clockout ($T_{co}$), because the rounding and saturation operations are carried out later.

Figure 11:
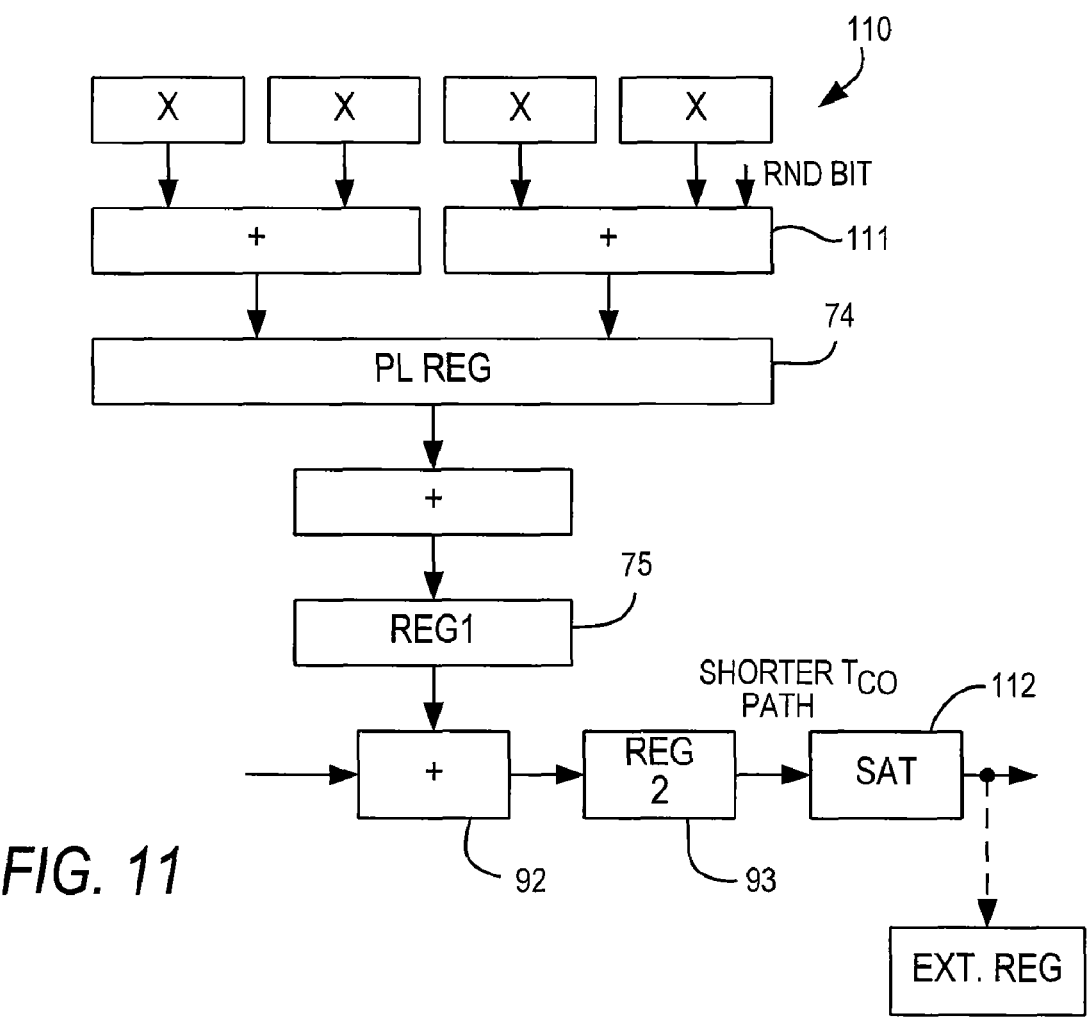
FIG. 11 is a schematic diagram of a portion of a specialized processing block in cascade-mode showing location of rounding and saturation logic in accordance with yet another embodiment of the present invention.

Therefore, a further embodiment 110 shown in FIG. 11, which may be programmably implemented in specialized processing block 10, is available in a round-to-nearest implementation, which, as described above, requires only adding 1 in the next most significant place and truncating. This occurs at 111 before register 74, and is therefore outside the critical path. Separate saturation circuitry 112 is after register 93, and therefore also is outside the critical path. While the location of saturation circuitry 112 increases $T_{co}$ as in embodiment 100, it does not increase $T_{co}$ by as much, because only saturation, not rounding, is being performed. In a further alternative (not shown), a look-ahead implementation similar to embodiment 80 of FIG. 8 can be used in combination with the separate saturation circuitry 112 of FIG. 11.

Thus it is seen that a specialized processing block for a programmable logic device, based on a plurality of fundamental processing units, has been provided, and that such a specialized processing block can perform numerous filtering operations useful, e.g., in digital signal processing operations and similar operations.

Figure 12:
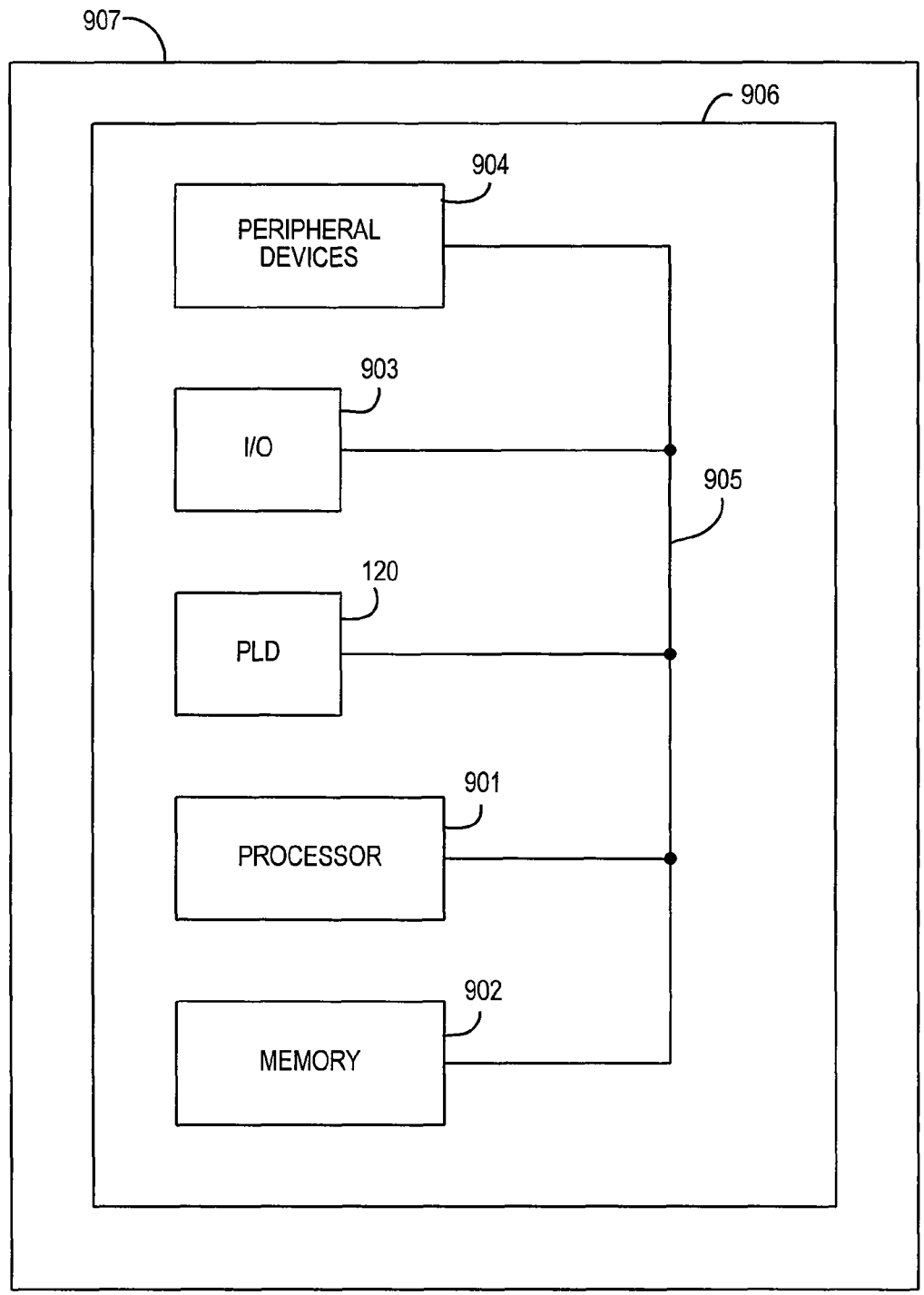
FIG. 12 is a simplified block diagram of an illustrative system employing a programmable logic device incorporating the present invention.

A PLD 120 incorporating such circuitry according to the present invention may be used in many kinds of electronic devices. One possible use is in a data processing system 900 shown in FIG. 12. Data processing system 900 may include one or more of the following components: a processor 901; memory 902; I/O circuitry 903; and peripheral devices 904. These components are coupled together by a system bus 905 and are populated on a circuit board 906 which is contained in an end-user system 907.

System 900 can be used in a wide variety of applications, such as computer networking, data networking, instrumentation, video processing, digital signal processing, or any other application where the advantage of using programmable or reprogrammable logic is desirable. PLD 120 can be used to perform a variety of different logic functions. For example, PLD 120 can be configured as a processor or controller that works in cooperation with processor 901. PLD 120 may also be used as an arbiter for arbitrating access to a shared resources in system 900. In yet another example, PLD 120 can be configured as an interface between processor 901 and one of the other components in system 900. It should be noted that system 900 is only exemplary, and that the true scope and spirit of the invention should be indicated by the following claims.

Various technologies can be used to implement PLDs 120 as described above and incorporating this invention.

It will be understood that the foregoing is only illustrative of the principles of the invention, and that various modifications can be made by those skilled in the art without departing from the scope and spirit of the invention. For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. A specialized processing block for a programmable logic device, said specialized processing block comprising:
   arithmetic circuitry for providing products of inputs and sums of said products to output a result, said arithmetic circuitry comprising a plurality of fundamental processing units, each of said fundamental processing units including:
   a plurality of partial product generators, each respective one of said partial product generators having a respective pair of inputs different from inputs of each other one of said partial product generators and providing a respective plurality of vectors representing a respective partial product,
   compressor circuitry that compresses each respective plurality of vectors into a smaller number of vectors representing said respective partial product, and
   circuitry for adding, in one operation, partial products represented by said smaller number of vectors produced by all of said plurality of partial product generators, each said respective partial product being unroutable to any output of said specialized processing block, thereby being unavailable for output, except after being added, by said circuitry for adding, to other of said respective partial products; said specialized processing block further comprising:
   rounding circuitry that provides both:
   a first user-selectable option to round said result to a nearest integer, and
   a second user-selectable option to round said result to a nearest even integer.

2. The specialized processing block of claim 1 wherein said rounding circuitry accepts input of a variable that encodes a bit position at which rounding of said result is performed.

3. The specialized processing block of claim 1 wherein:
   said arithmetic circuitry operates on values in a range that extends up to a most highly positive value and down to a most highly negative value; said specialized processing block further comprising:
   saturation circuitry for clipping said result to a value inside said range; wherein:
   said saturation circuitry accepts input of a variable that encodes a bit position at which saturation of said result is performed.

4. The specialized processing block of claim 3 wherein said saturation circuitry clips said results symmetrically.

5. The specialized processing block of claim 3 wherein said saturation circuitry clips said results asymmetrically.

6. The specialized processing block of claim 3 wherein said saturation circuitry operates after said rounding circuitry.

7. The specialized processing block of claim 1 wherein said rounding circuitry is programmably locatable to optimize operation of said specialized processing block.

8. The specialized processing block of claim 7 wherein at least a first portion of said rounding circuitry is programmably locatable in parallel with at least a portion of said arithmetic circuitry to operate in a look-ahead mode.

9. The specialized processing block of claim 8 wherein:
said portion of said arithmetic circuitry computes said result without rounding;
said first portion of said rounding circuitry computes said result with rounding in parallel with computation by said portion of said arithmetic circuitry of said result without rounding; and
said rounding circuitry further comprises a second portion that selects between said result with rounding and said result without rounding.

10. The specialized processing block of claim 7 wherein:
said arithmetic circuitry includes a register creating a critical timing path; and
said rounding circuitry is programmably locatable in at least one position that is at least one of (a) before, and (b) after, said register so as to be programmably includable in, and excludable from, said critical timing path.

11. The specialized processing block of claim 10 wherein said critical timing path includes results chained from another said specialized processing block.

12. A programmable logic device comprising the specialized processing block of claim 1.

13. A digital processing system comprising:
processing circuitry;
a memory coupled to said processing circuitry; and
a programmable logic device as defined in claim 12 coupled to the processing circuitry and the memory.

14. A printed circuit board on which is mounted a programmable logic device as defined in claim 12.

15. The printed circuit board defined in claim 14 further comprising:
memory circuitry mounted on the printed circuit board and coupled to the programmable logic device.

16. The printed circuit board defined in claim 15 further comprising:
processing circuitry mounted on the printed circuit board and coupled to the memory circuitry.

17. An integrated circuit device comprising the specialized processing block of claim 1.

18. A digital processing system comprising:
processing circuitry;
a memory coupled to said processing circuitry; and
an integrated circuit device as defined in claim 17 coupled to the processing circuitry and the memory.

19. A printed circuit board on which is mounted an integrated circuit device as defined in claim 18.

20. The printed circuit board defined in claim 19 further comprising:
memory circuitry mounted on the printed circuit board and coupled to the programmable logic device.

21. The printed circuit board defined in claim 20 further comprising:
processing circuitry mounted on the printed circuit board and coupled to the memory circuitry.

22. A specialized processing block for a programmable logic device, said specialized processing block comprising:
arithmetic circuitry that operates on values in a range that extends up to a most highly positive value and down to a most highly negative value for providing products of inputs and sums of said products to output a result, said arithmetic circuitry comprising a plurality of fundamental processing units, each of said fundamental processing units including:
a plurality of partial product generators, each respective one of said partial product generators having a respective pair of inputs different from inputs of each other one of said partial product generators and providing a respective plurality of vectors representing a respective partial product,
compressor circuitry that compresses each respective plurality of vectors into a smaller number of vectors representing said respective partial product, and
circuitry for adding, in one operation, partial products represented by said smaller number of vectors produced by all of said plurality of partial product generators, each said respective partial product being unroutable to any output of said specialized processing block, thereby being unavailable for output, except after being added, by said circuitry for adding, to other of said respective partial products; said specialized processing block further comprising:
saturation circuitry for clipping said result to a value inside said range; wherein:
said saturation circuitry accepts input of a variable that encodes a bit position at which saturation of said result is performed.

23. The specialized processing block of claim 22 wherein said saturation circuitry clips said results symmetrically.

24. The specialized processing block of claim 22 wherein said saturation circuitry clips said results asymmetrically.

25. A programmable logic device comprising the specialized processing block of claim 22.

26. A digital processing system comprising:
processing circuitry;
a memory coupled to said processing circuitry; and
a programmable logic device as defined in claim 25 coupled to the processing circuitry and the memory.

27. A printed circuit board on which is mounted a programmable logic device as defined in claim 25.

28. The printed circuit board defined in claim 27 further comprising:
memory circuitry mounted on the printed circuit board and coupled to the programmable logic device.

29. The printed circuit board defined in claim 28 further comprising:
processing circuitry mounted on the printed circuit board and coupled to the memory circuitry.

30. An integrated circuit device comprising the specialized processing block of claim 22.

31. A digital processing system comprising:
processing circuitry;
a memory coupled to said processing circuitry; and
an integrated circuit device as defined in claim 30 coupled to the processing circuitry and the memory.

32. A printed circuit board on which is mounted an integrated circuit device as defined in claim 31.

33. The printed circuit board defined in claim 32 further comprising:
memory circuitry mounted on the printed circuit board and coupled to the programmable logic device.

34. The printed circuit board defined in claim 33 further comprising:
processing circuitry mounted on the printed circuit board and coupled to the memory circuitry.

* * * * *